(12) United States Patent
Eisenhauer et al.

(10) Patent No.: US 6,450,044 B1
(45) Date of Patent: Sep. 17, 2002

(54) TORQUE TRANSDUCER

(75) Inventors: Karl Yarnos Eisenhauer, Berowra Heights (AU); John Baxter, Chatswood (AU)

(73) Assignee: Bishop Innovation Limited, North Ryde (AU)

( * ) Notice: Subject to any disclaimer, the term of this patent is extended or adjusted under 35 U.S.C. 154(b) by 0 days.

(21) Appl. No.: 09/463,980

(22) PCT Filed: Aug. 14, 1998

(86) PCT No.: PCT/AU98/00645

§ 371 (c)(1),
(2), (4) Date: May 3, 2000

(87) PCT Pub. No.: WO99/09385

PCT Pub. Date: Feb. 25, 1999

(30) Foreign Application Priority Data

Aug. 15, 1997 (AU) .............................................. PO 8566
Oct. 17, 1997 (AU) .............................................. PO 9847
Feb. 5, 1998 (AU) .............................................. PP 1676
Apr. 23, 1998 (AU) .............................................. PP 3142

(51) Int. Cl.[7] .................................................. G01L 3/02
(52) U.S. Cl. .................................................. 73/862.193
(58) Field of Search ........................ 73/862.08, 862.21, 73/862.23, 862.34, 862.36, 118, 324; 356/354, 28.5; 250/225

(56) References Cited

U.S. PATENT DOCUMENTS 3,906,785 A * 9/1975 Black et al. ................... 73/118
5,001,937 A * 3/1991 Bechtel et al. ............ 73/862.34
5,042,157 A * 8/1991 Garrett et al. ............. 33/363 K
5,369,583 A * 11/1994 Hezelden ................ 364/424.05
5,389,780 A * 2/1995 Anderson .................... 250/225
5,490,430 A * 2/1996 Anderson et al. ....... 73/862.324
6,111,645 A * 8/2000 Tearney et al. ................ 35/354

FOREIGN PATENT DOCUMENTS

| CA | 962475 | 2/1975 |
| EP | 185619 | 2/1986 |
| WO | 91/19169 | 12/1991 |

* cited by examiner

Primary Examiner—Benjamin R. Fuller
Assistant Examiner—Jewel V. Thompson
(74) Attorney, Agent, or Firm—Arnet Fox Kintner Plotkin & Kahn, PLLC

(57) ABSTRACT

A torque transducer having a rotating shaft with first and second substantially rigid torque input members connected by a torsionally compliant coupling that enables angular deflection of the first torque input member relative to the second torque input member as a function of the magnitude of the torque in the shaft. First and second grating elements are attached to or integral with first and second torque input members, respectively. The grating elements have surfaces with alternating regions of high and low reflectivity connected by a torsionally compliant coupling. The surfaces are illuminated by a source of electromagnetic radiation (EMR), which generates patterns on one or more arrays of detectors sensitive to the EMR. The disposition of the patterns is a function of torque applied to the shaft, and the output of the one or more arrays can be processed to produce a measure of the torque applied to the shaft.

32 Claims, 30 Drawing Sheets

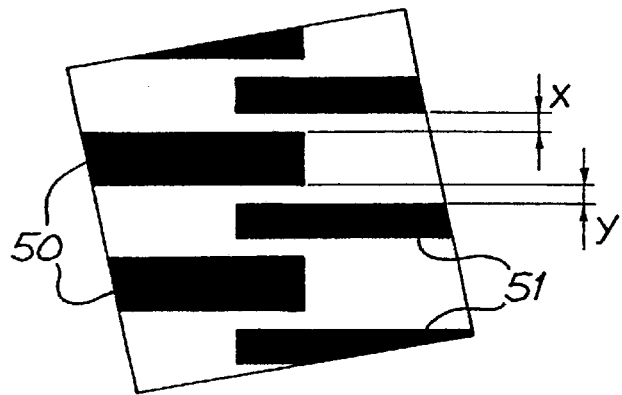
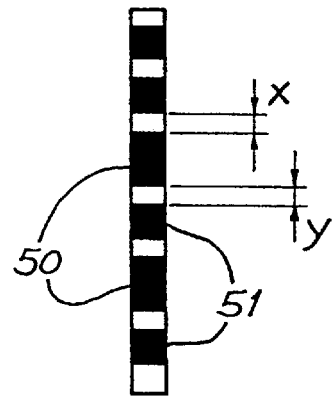
FIG. 21a  FIG. 21b
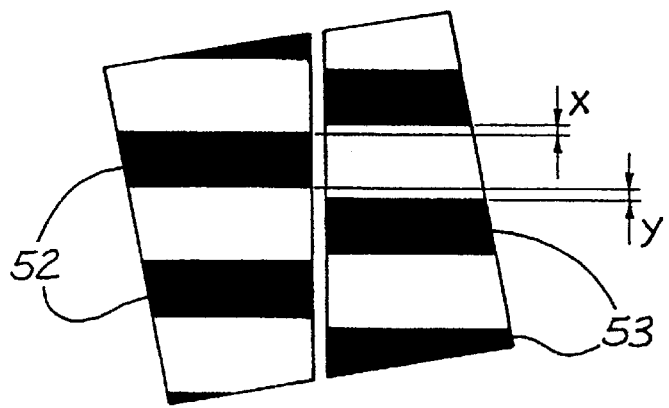
FIG. 22

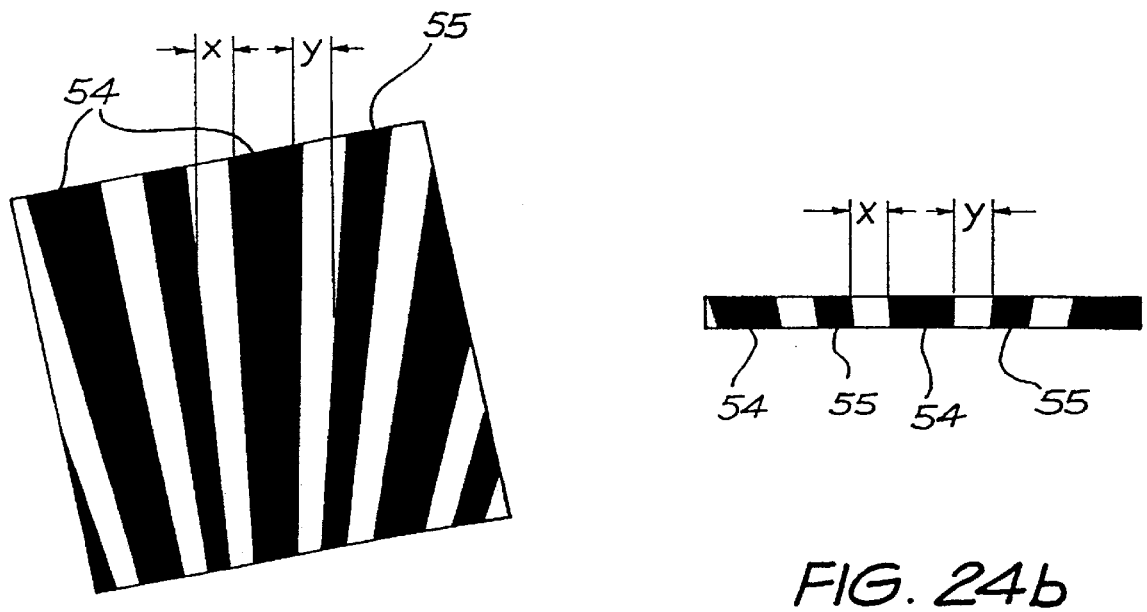
FIG. 24a
FIG. 24b
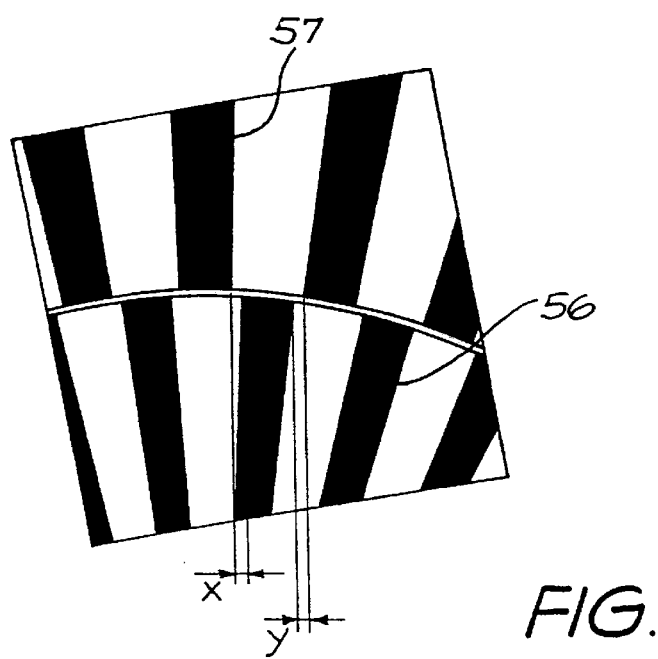
FIG. 25

TORQUE TRANSDUCER

TECHNICAL FIELD

This invention relates to torque transducers for measuring the magnitude of torque in shafts, in particular rotating shafts such as found in electric power steering systems in vehicle applications.

BACKGROUND

Electric power steering systems conventionally incorporate an input shaft element, connected via an intermediate shaft and Hookes joint arrangement to the steering wheel. The input shaft therefore needs to rotate through an angle typically one to two revolutions either side of the on-centre steering position. The input shaft is at least partially surrounded by the fixed housing of the steering gear. It is a requirement of the electric power steering servo system to accurately measure the continuously varying torque in this rotating shaft. Conventionally torque applied to the shaft causes it to is angularly deflect, such deflection causing one part of the shaft to angularly displace with respect to another part, and this displacement is sensed to provide a measurement of this torque.

The sensing means needs to allow for rotation of the shaft within the housing, usually employing non-contact or mechanical signal transmission means. Non-contact means include optical aperture based devices and magnetic devices such as magnetostrictive or variable reluctance couplings. Mechanical means include slidably connected potentiometers and other indicating devices.

To improve the accuracy of such sensing means a torsionally compliant coupling in the form of a torsion bar is used to connect the two input members at either end of the shaft When torque is applied between the two input members the torsion bar deflects causing an increased angular displacement, which allows the use of less sensitive, or less accurate sensing means.

The torsion bar may be in the form of a separate element as in the case of a conventional rotary hydraulic power steering valve. Alternatively, in the case of some proposed electric power steering systems, the torsion bar may in fact be integral with the shaft member and be a relatively torsionally compliant (ie. less torsionally stiff) portion of the shaft member which couples substantially rigid torque input members at each end of the shaft member. The shaft member in these latter systems can be readily machined as a single steel component, and the only requirement is that the angular deflection of the relatively torsionally compliant coupling portion, connecting the two substantially rigid torque input member portions, has sufficiently low torsional stiffness that the sensing system is able to accurately measure its angular deflection.

Generally, the use of a torsion bar requires the use of a failsafe mechanism, being a torque limiting device to prevent failure of the torsion bar when unavoidable torque overload conditions occur.

Such torque limiting devices are well known in the art of vehicle steering, and will therefore not be described in this specification.

The prior art, which is most closely related to that of the present invention, is described in U.S. Pat. No 5,369,583 and International Patent Application PCT/GB95/02017 which show sensors employing optical disc apertures for measuring torque.

The essence of the present invention resides in the provision of grating elements comprising surfaces composed of alternating regions of high and low reflectivity connected by a torsionally compliant coupling. These surfaces are illuminated by a source of electromagnetic radiation (EMR), typically UV, visible or IR light, which generates patterns on one or more arrays of detectors sensitive to the EMR. Arrays include CCD devices, VLSI vision chips, one and 2 dimensional photodetector arrays and lateral effect photodiodes (commonly referred to as PSD's or position sensitive devices). The disposition of the patterns is a function of torque applied to the shaft, and the output of the one or more arrays can be processed to produce a measure of the torque applied to the shaft. It is distinguished from other reflective torque transducers by use of an reflective imaging approach which does not rely on Moire fringes, speckle patterns or other diffraction gratings. As it uses photo detector arrays, EMR reflected from the gratings provide an instantaneous image which allows a much faster and more complete means of interpreting the information than is possible with individual photo-detectors. In the latter case it is necessary to count successive changes of EMR intensity incident on the photo-detector, which is slower and more prone to error.

Another reflective torque transducer that uses arrays is described in U.S. Pat. No. 5,490,430. This relies on a change in diffraction angle of two or more diffraction gratings that are torsionally strained by the application of torque. This device is prone to error due to misalignment and bending load and requires a collimated and monochromatic source of EMR. The regions of high and low reflectivity can be arranged axially or radially about the axis of rotation of the shaft, and are of such a nature that allows a continuous output of the arrays at any instant in time regardless of the angular position of the shaft, as the limited array dimensions may not allow the complete circumference or radial face to be viewed by the arrays. The advantages of such a construction over that disclosed in U.S. Pat. No. 5,369,583 and International Application Number PCT/GB95/02017 may arise as one or more of the following:

Firstly, the use of reflective grating elements allows simpler and more compact construction by the use of a cylindrical grating element arrangement, which is not readily achievable using disc apertures as shown in the prior art without requiring a significantly increased diameter. It also allows the EMR source(s) and array(s) to be packaged in the same assembly with further savings in space and cost. Secondly, it allows for easy assembly and disassembly of the transducer, as the grating elements can be removed from one end of the transducer in an axial direction without disturbing the EMR source(s) or array(s).

Thirdly, another advantage with the use of reflective grating elements is that the EMR is reflected from the surface, and is not affected by edge scattering as is the case with apertures with a non-zero thickness. Such scattering limits the maximum resolution of the device. Fourthly, the use of reflective grating elements allows the use of well known and accurate photographic or metallising techniques, for example metal on glass. The use of these techniques with apertures may result in loss of resolution or other problems from internal reflection, diffraction or degradation over time as the EMR has to travel through the glass between the metallised regions.

Finally, the use of reflective grating elements allow the use of intermeshed castellations which can provide a lost motion connection limiting the maximum angular deflection of the torsion bar, thereby eliminating the need for a separate torque limiting device and reducing the cost and complexity of the transducer.

DISCLOSURE OF INVENTION

The present invention consists in a torque transducer comprising a rotating shaft at least partially surrounded by a fixed housing, the axis of rotation of the shaft fixed with respect to the housing, the shaft comprising first and second substantially rigid torque input members which are connected by a torsionally compliant coupling, the coupling thereby enabling angular deflection of the first torque input member relative to the second torque input member as a function of the magnitude of the torque in the shaft, a first grating element attached to or integral with the first torque input member and a second grating element attached to or integral with the second torque input member, the first grating element comprising a first surface and the second grating element comprising a second surface, the transducer also comprising one or more electromagnetic radiation (EMR) sources and one or more arrays of EMR sensitive detectors, characterised in that each source irradiates one or both of the surfaces and each array receives incident EMR reflected from one or both of the surfaces, the one or more sources irradiating each surface and the one or more arrays receiving incident EMR reflected from this surface are all positioned in the same side of this surface and fixed with respect to the housing, both surfaces comprise alternating regions of high and low reflectivity, a pattern produced by incident EMR on each of the one or more arrays at any instant of time resulting from the alternating regions of low and high reflectivity on the one or both surfaces providing reflected EMR to this array regardless of the angular position of the shaft and irrespective of the relative angular deflection of the first and second torque input members, the output from the one or more arrays, resulting from the pattern or patterns on the one or more arrays at said any instant of time, is processed by a processor to derive the relative angular deflection of the first and second torque input members, and hence provide a measure of the magnitude of the torque in the shaft.

In some embodiments of the present invention a first array receives incident EMR reflected from a first surface and results in a first pattern, and a second array receives incident EMR reflected from a second surface and results in a second pattern. It is preferred that the processor receives inputs from the first and second arrays, and the processor comprises software or hardware electronic means to determine the relative displacement of the first and second patterns.

In other embodiments of the present invention the first and second surfaces are either mutually adjacent or contiguous, a single array receives incident EMR reflected from both first and second surfaces and results in a single pattern, the pattern comprises a is first subpattern produced by the incident EMR reflected from the first surface and a second subpattern produced by the incident EMR reflected from the second surface. It is preferred that the processor receives inputs from the single array, and the processor comprises software or hardware electronic means to determine the relative displacement of the first and second subpatterns. It is preferred that the single pattern is an interdigital pattern comprising the first subpattern interposed between the second subpattern.

It is preferred that at least one of first or second surfaces is substantially cylindrical with a central axis collinear with the axis of rotation of the shaft, and the array, which receives incident EMR reflected from the at least one surface, is positioned radially inside or outside the surface. It is preferred that the at least one substantially cylindrical surface is discontinuous due the respective grating element comprising radially protruding castellations around its periphery, the castellations are substantially axially aligned, the regions of high reflectivity correspond to the areas of maximum radius of the castellations with respect to the central axis of the cylindrical surface, and the regions of low reflectivity are angularly aligned with the discontinuous gap areas or lesser radius areas between the castellations. Also it is preferred that the grating element is manufactured from metal or plastic material and the areas of maximum radius are smoothly machined, moulded or sintered, or surface treated with paint or material deposition to impart high reflectivity, and the discontinuous gap areas or lesser radius areas are machined, moulded or sintered, or surface treated with paint or material deposition to impart low reflectivity.

Alternatively, in certain applications, it may be preferred that the at least one substantially cylindrical surface is substantially continuous due to the respective grating element comprising a substantially smooth cylinder, the inside or outside surface of the cylinder comprising the alternating regions of high and low reflectivity, and the regions are substantially axially aligned. Preferably the regions of high reflectivity are. metallised, shiny or light coloured and the regions of low reflectivity are substantially transparent, roughened or dark coloured.

Alternatively, in certain applications, it may be preferred that the at least one of first or second surfaces is substantially radially disposed with respect to the axis of rotation of the shaft, and the array, which receives incident EMR reflected from the at least one surface, is positioned axially on one side of the surface. Preferably, the at least one substantially radially disposed surface is discontinuous due to the respective grating element comprising axially protruding castellations around its periphery, the castellations are substantially radially disposed, the regions of high reflectivity correspond to the areas of maximum axial protrusion of the castellations, and the regions of low reflectivity are angularly aligned with the discontinuous gap areas or less axially protruding areas between the castellations. Also it is preferred that the grating element is manufactured from metal or plastic material, the areas of maximum axial protrusion are smoothly machined, moulded or sintered, or surface treated with paint or material deposition to impart high reflectivity, and the discontinuous gap areas or less axially protruding areas are machined, moulded or sintered, or surface treated with paint or material deposition to impart low reflectivity.

Alternatively, in certain applications, it may be preferred that the at least one substantially radially disposed surface is substantially continuous due to the respective grating element comprising a substantially smooth disc or planar ring, one side of the disc or planar ring comprising the alternating regions of high and low reflectivity, the regions are substantially radially disposed, the regions of high reflectivity are metallised, shiny or light coloured, and the regions of low reflectivity are substantially transparent, roughened or dark coloured.

Preferably the array comprises a one dimensional or a two dimensional array, a CCD, a VLSI vision chip or a lateral effect photodiode.

Preferably the pattern or patters is also processed by a processor to derive angular velocity and/or the relative angular position of at least one of the torque input members Preferably surface of at least one grating element includes areas or additional regions of high or low reflectivity whose resulting pattern is also processed to derive absolute angular position of the torque input member to which the at least one grating element is attached to or integral with.

Preferably the alternating regions of high and low reflectivity on the surface of the at least one grating element are arranged in the form of a succession of individual binary bar codes arranged such that the individual bar codes do not overlap. Alternatively the alternating regions of high and low reflectivity on the surface of the at least one grating element are arranged in the form of a succession of individual bar codes arranged such that the individual bar codes overlap. The resulting pattern on the respective array is processed to derive the absolute angular position of the torque input member to which the at least one grating element is attached to or integral with. It is preferred that a succession of binary bar codes are employed on both grating elements and the difference in the absolute angular position of the first and second torque input members is used to provide a measure of the magnitude of the torque in the shaft.

Preferably the first and second grating elements are adjacent and comprise radially extending intermeshing castellations, clearance being provided between the castellations and thereby providing a rotational lost motion connection between the first and second torque input members and hence limiting the maximum angular deflection of the torsionally compliant coupling.

BRIEF DESCRIPTION OF DRAWINGS

The present invention will now be described by way of example with reference to the accompanying drawings, in which:

FIGS. 21a shows a typical pattern produced on the single array according to the second embodiment of the present invention, where this array is a two dimensional array, FIG. 21b shows a typical pattern produced on the single array according to the second embodiment of the present invention, where this array is a one dimensional array, FIG. 22 shows a typical pattern produced on the single two dimensional array according to the third embodiment of the present invention, FIG. 24a shows a typical patter produced on the single array according to the fifth embodiment of the present invention, where this array is a two dimensional array, FIG. 24b shows a typical pattern produced on the single array according to the fifth embodiment of the present invention, where this array is a one dimensional array, FIG. 25 shows a typical pattern produced on the single two dimensional array according to the sixth embodiment of the present invention.

MODE OF CARRYING OUT INVENTION

Figure 1:
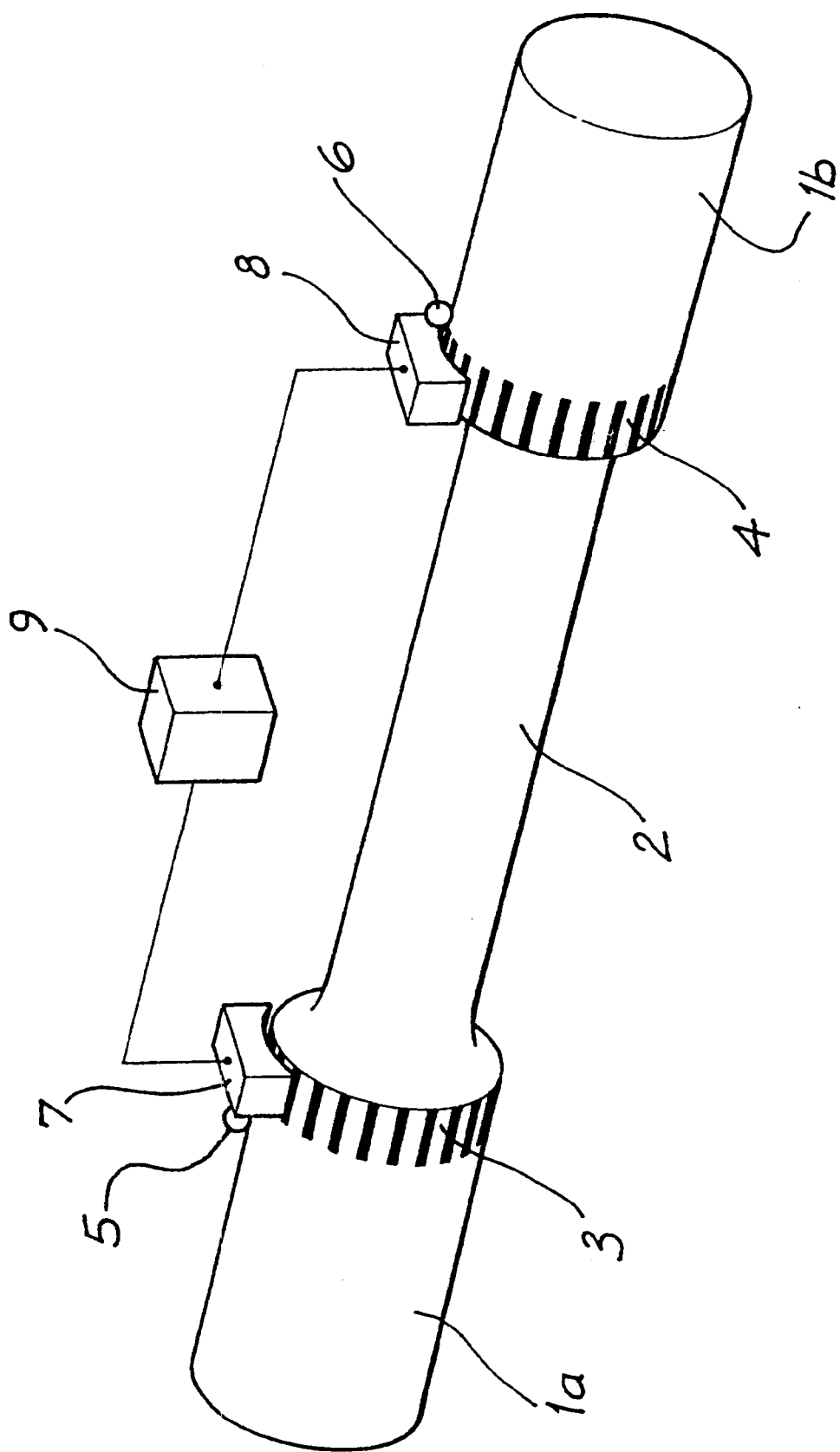
FIG. 1 is a diagrammatic view of two torque input members connected by a torsion bar, showing the regions of high and low reflectivity on the surfaces of the grating elements and the associated two arrays.

FIG. 1 shows grating elements 3 and 4 attached to torque input members 1a and 1b of the shaft at either end of a torsionally compliant coupling in the form of torsion bar 2. Grating elements 3 and 4 comprise surfaces composed of alternating regions of high and low reflectivity. Electromagnetic radiation (EMR) sources 5 and 6 are disposed to illuminate the surfaces. Arrays 7 and 8 of EMR sensitive detectors receive incident EMR reflected from the surfaces and the patterns thus generated on arrays 7 and 8 are processed by processor 9.

Figure 2:
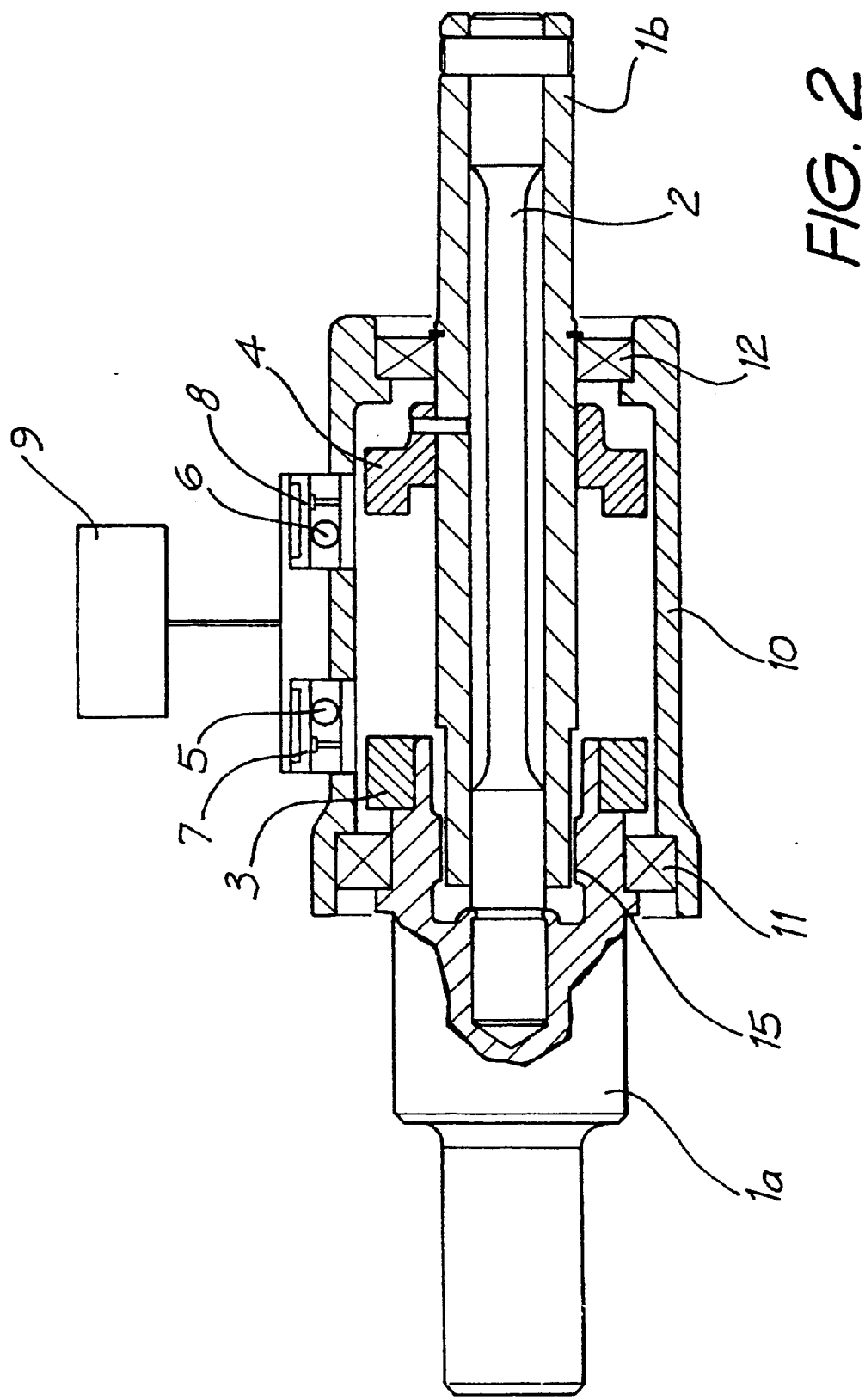
FIG. 2 is a cross section of torque transducer according to a first embodiment of the present invention based on the concept shown in FIG. 1.

FIG. 2 shows a cross section of a torque transducer according to a first embodiment of the present invention, using the principles shown in FIG. 1. Cylindrical grating elements 3 and 4, comprising surfaces composed of alternating high and low reflectivity, are attached to torque input members 1a and 1b which are connected to either end of the torsion bar 2. In other (not shown) embodiments either (or both) grating elements may be integral with their respective torque input members. The assembly is enclosed in housing 10 and supported by bearings 11 and 12. EMR sources 5 and 6 are disposed to illuminate the surfaces. Arrays 7 and 8 of detectors receive incident EMR from the surfaces and the patterns thus generated on the arrays are processed by a processor 9 to provide a measurement of torque. When torque is applied between torque input members 1a and 1b torsion bar 2 angularly deflects, resulting in a displacement of one pattern with respect to the other. Failsafe mechanism 15 limits the maximum torque carried by the torsion bar 2 by providing a limit to the amount of angular deflection of torque input member 1a with respect to torque input member 1b. Such a failsafe mechanism is well known in the art of power steering.

Figure 3:
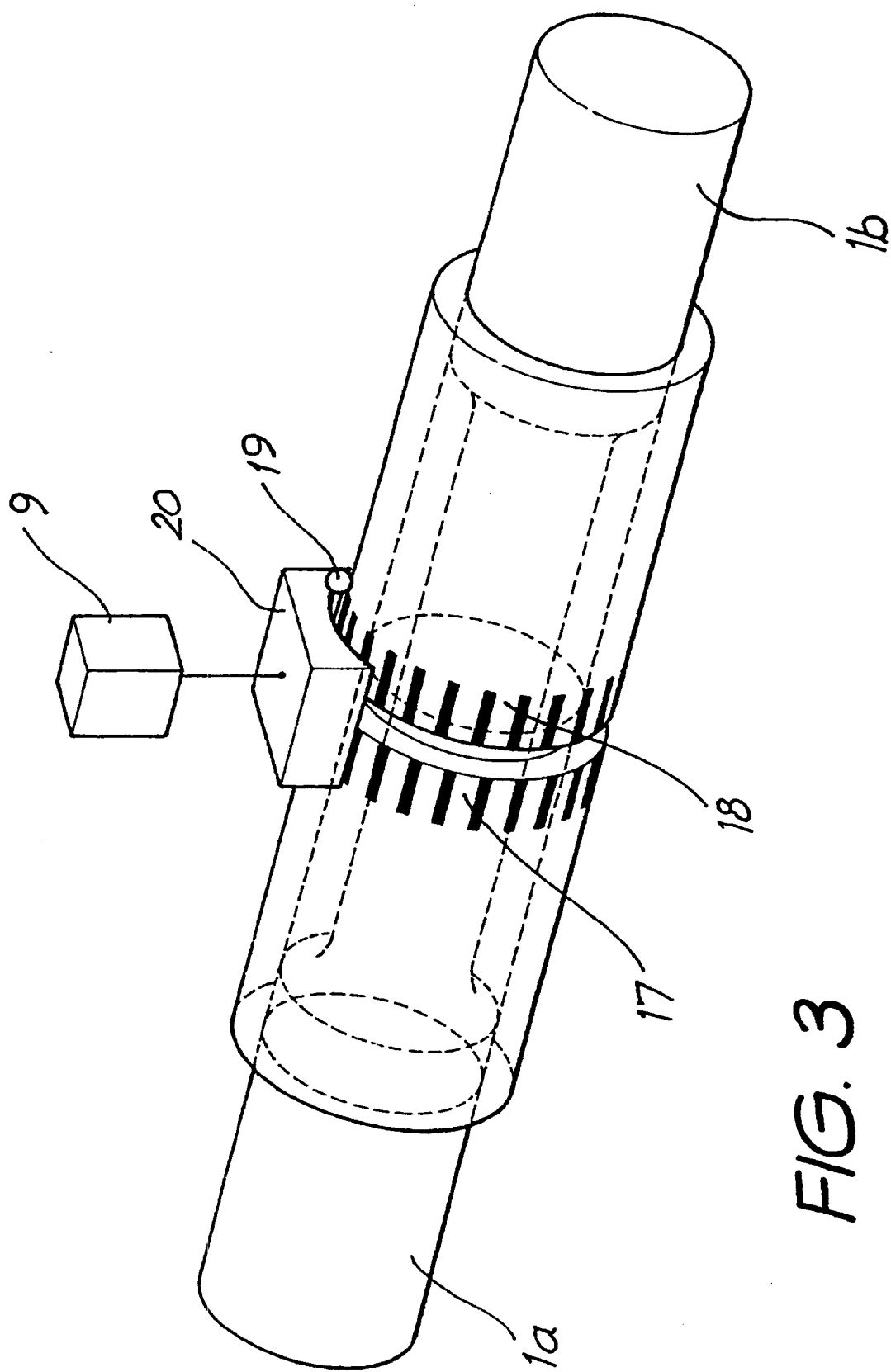
FIG. 3 is a diagrammatic view of two torque input members connected by a torsion bar, showing the regions of high and low reflectivity on the surfaces of the adjacent grating elements and the associated single array.

FIG. 3 shows another embodiment. Cylindrical grating elements 17 and 18, each comprising a continuous cylindrical surface composed of substantially axially aligned regions of alternating high and low reflectivity, are attached to torque input members 1a and 1b respectively which are in turn connected to either end of the torsion bar 2. Grating elements 17 and 18 are arranged such that they are adjacent. EMR source 19 is arranged to illuminate both surfaces, and the array 20 of detectors receives incident EMR from both surfaces and the pattern thus generated on the array is processed by the processor 9 to provide a measurement of torque.

Figure 4:
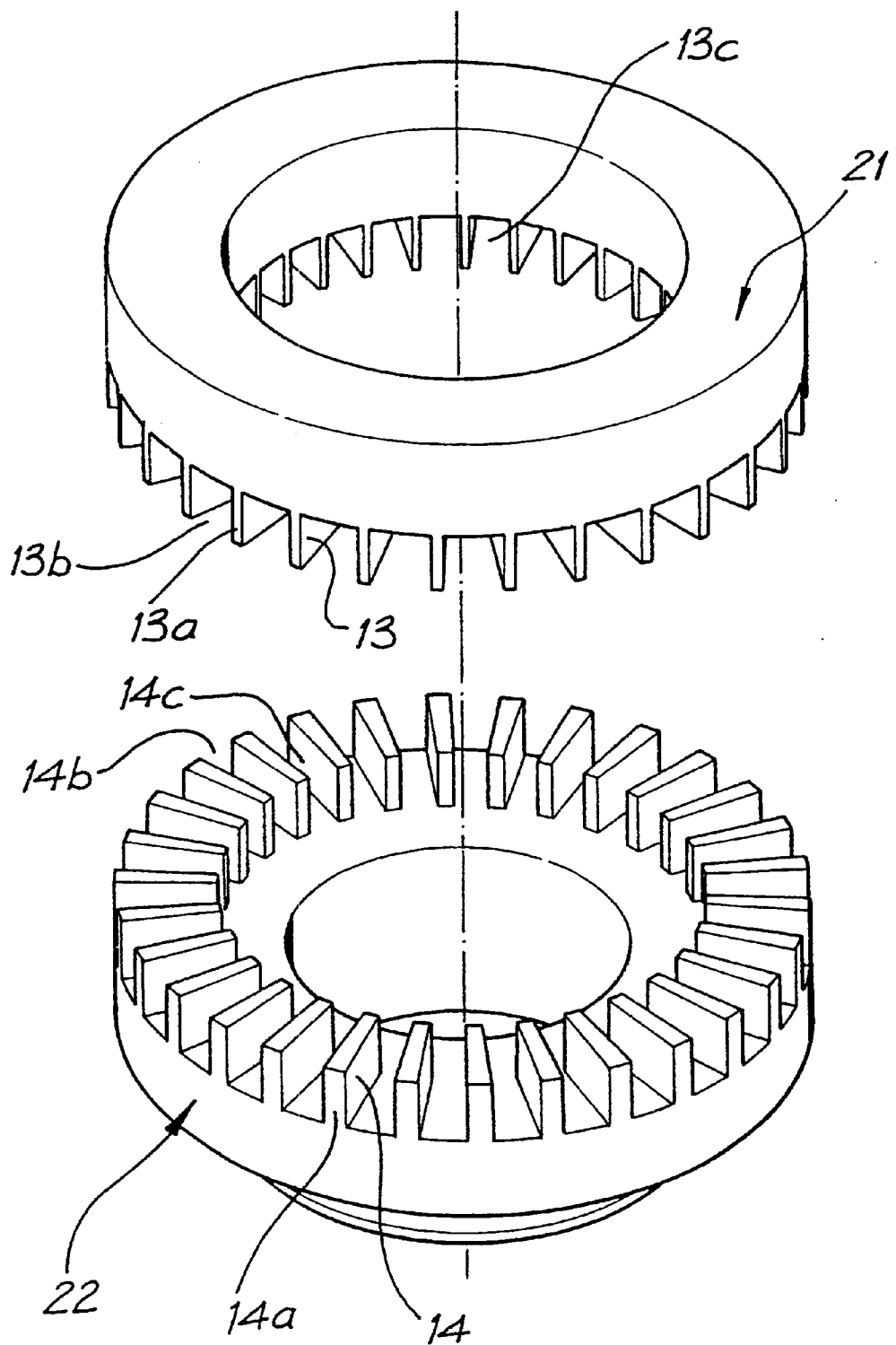
FIG. 4 is an exploded isometric view of an interdigital arrangement of two grating elements comprising castellations.
Figure 5:
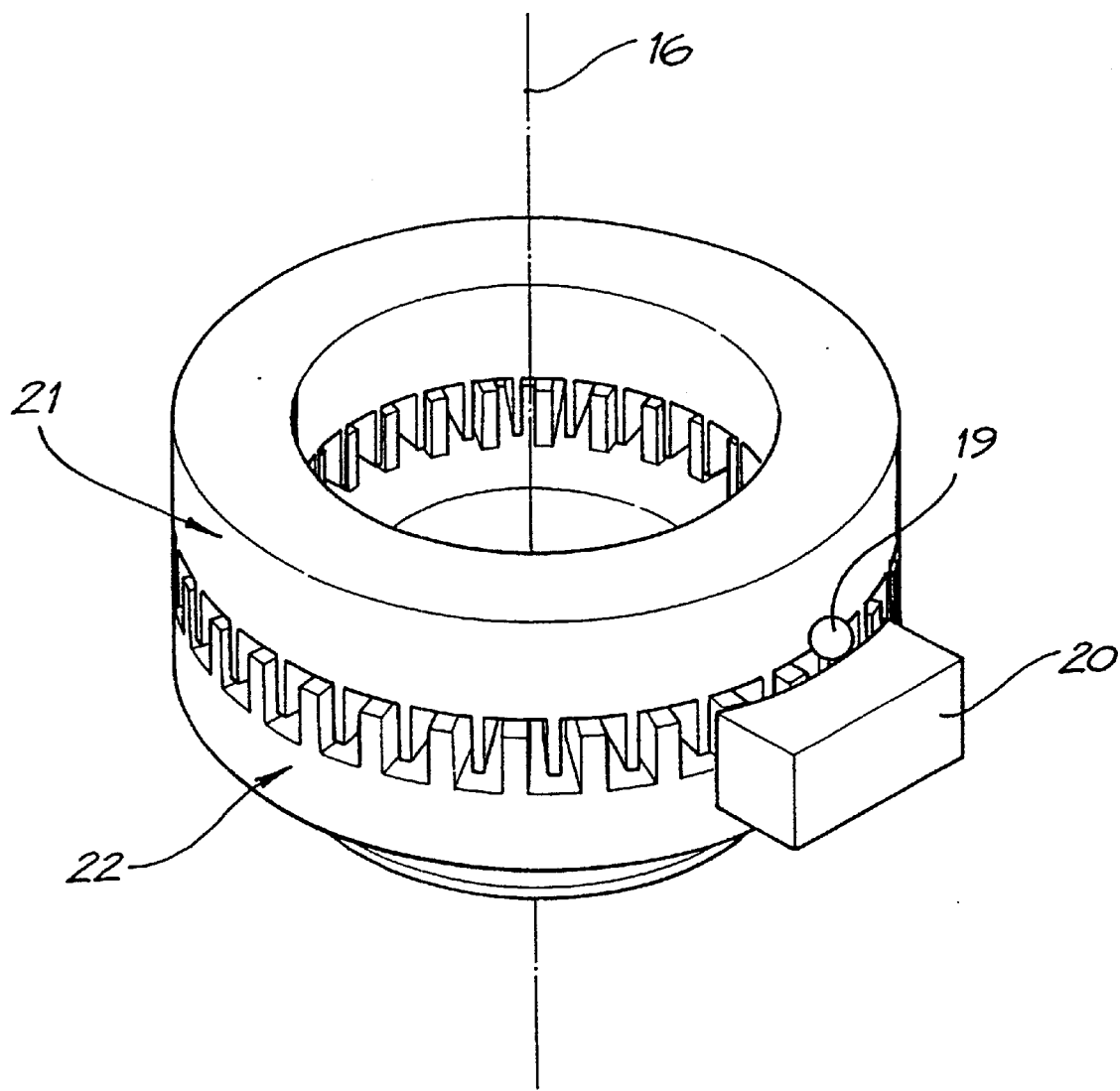
FIG. 5 is another view of FIG. 4 showing the actual relationship of the two grating elements and the associated single array.
Figure 6:
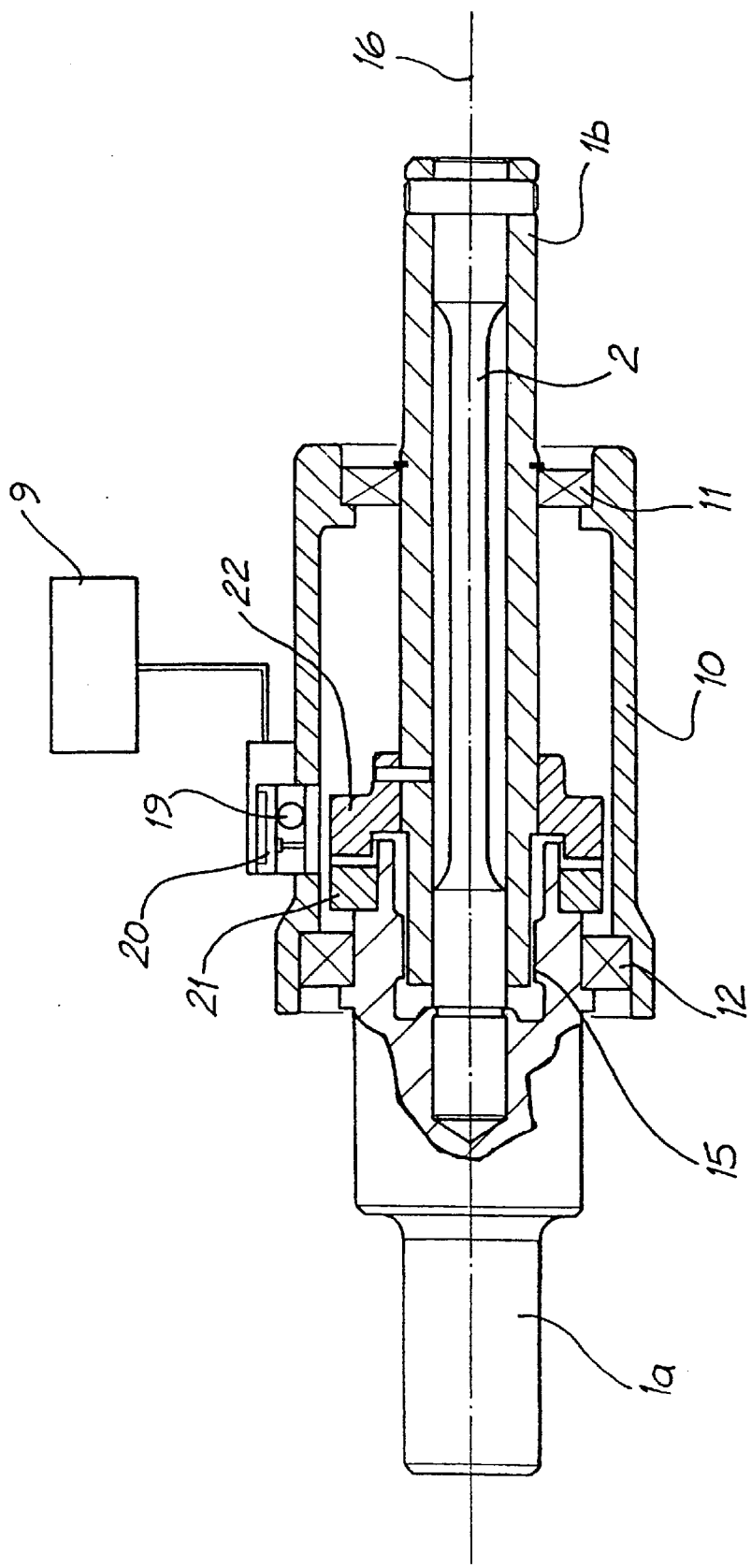
FIG. 6 is cross section of a torque transducer according to a second embodiment of the present invention, based on the concept shown in FIGS. 4 and 5.

FIGS. 4, 5 and 6 shows a second embodiment of the present invention. Cylindrical grating elements 21 and 22 are attached to torque input members 1a and 1b, connected to either end of the torsion bar 2. The outer cylindrical surfaces of grating elements 21 and 22 are discontinuous and are formed in part by substantially axially aligned, radially protruding castellations 13 and 14 respectively. The regions of high reflectivity correspond to the areas of maximum radius of the castellations with respect to their mutual central axis 16, that is outer peripheral areas 13a and 14a respectively, and may be smoothly machined, moulded or sintered, or surface treated with paint or material deposition to impart the required high reflectivity. The regions of low reflectivity are angularly aligned with the discontinuous gap areas of the outer cylindrical surfaces of grating elements 21 and 22, namely areas 13b and; 14b respectively and, in the embodiment shown here, are substantially non-reflective due to the presence of fully radially-extending (ie. full depth) cavities 13c and 14c between adjacent castellations 13 and 14 on each grating element 21 and 22 respectively. In other embodiments (not shown) the cavities may be alternatively truncated at a lesser radius than the aforementioned maximum radius, such resulting surface of lesser radius ideally being machined, moulded or sintered, or surface treated with paint or material deposition to impart low reflectivity. Grating elements 21 and 22 are interdigitally arranged as shown in FIG. 5. This assembly is enclosed in housing 10 and, supported by bearings 11 and 12. An EMR source 19 is arranged to illuminate the surfaces, and array 20 of detectors receives incident EMR reflected from the regions of high reflectivity 13a and 14a on the outer cylindrical surfaces of grating elements 21 and 22 respectively. The pattern thus generated on array 19, comprising therefore interdigitally disposed subpatterns generated by incident EMR reflected from regions 13a and 14a respectively, is processed by the processor 9 to provide a measurement of torque.

Figure 7:
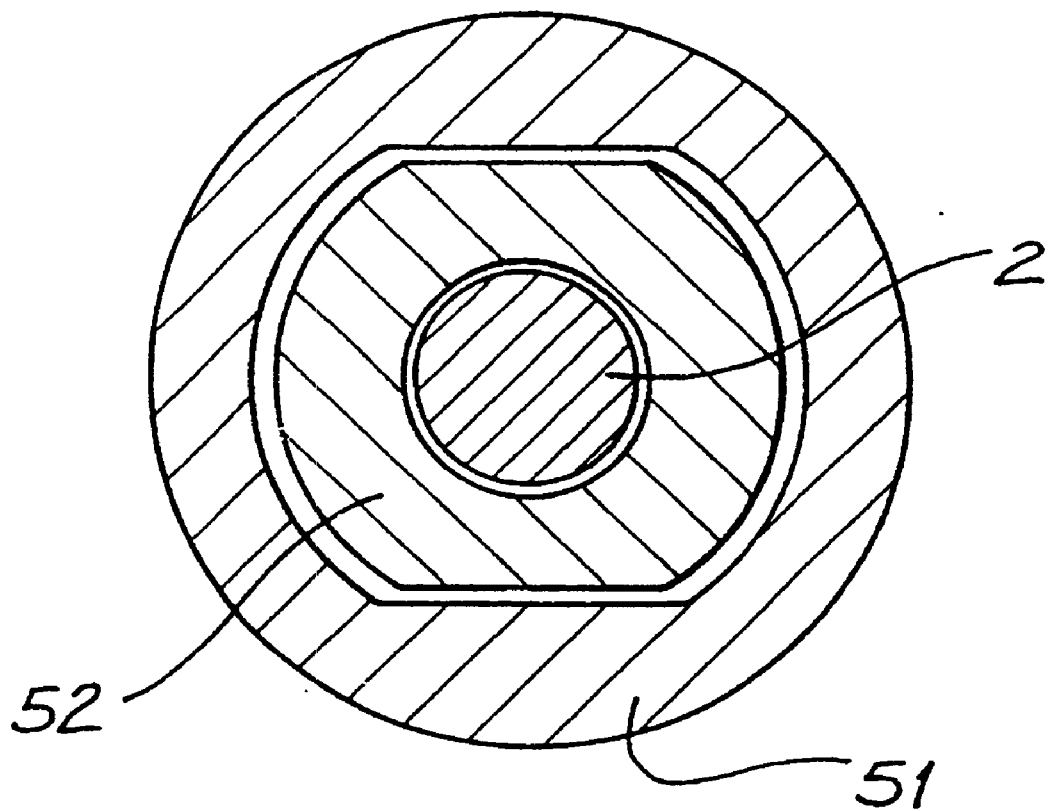
FIG. 7 is a cross section of the failsafe mechanism in the embodiments shown in FIGS. 2, 6, 8, 11, 12 and 16.

Failsafe mechanism 15, shown in cross section in FIG. 7, limits the maximum torque carried by torsion bar 2 by providing a maximum limit to its angular deflection. Referring back to FIG. 2, element 51 is a feature of torque input member 1a and element 52 is a feature of torque input member 1b, and interact to limit the maximum angular deflection of torsion bar 2. When the torque applied to torsion bar 2 reaches a predetermined maximum value elements 51 and 52 contact rotationally, providing an alternate torsional load path to torsion bar 2.

Figure 8:
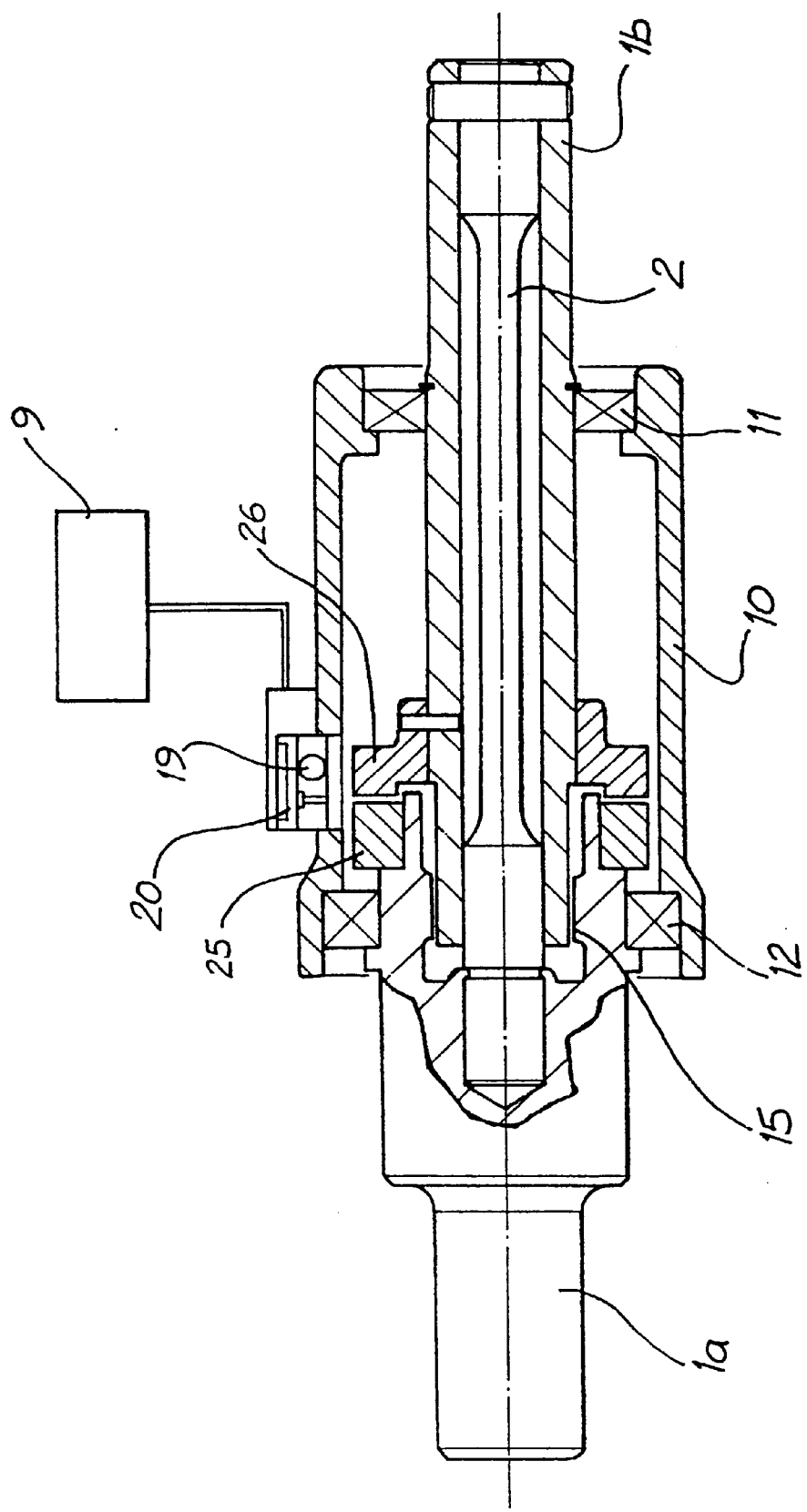
FIG. 8 is a cross section of a torque transducer according to a third embodiment of the present invention, utilising grating elements comprising substantially smooth cylindrical surfaces.
Figure 9:
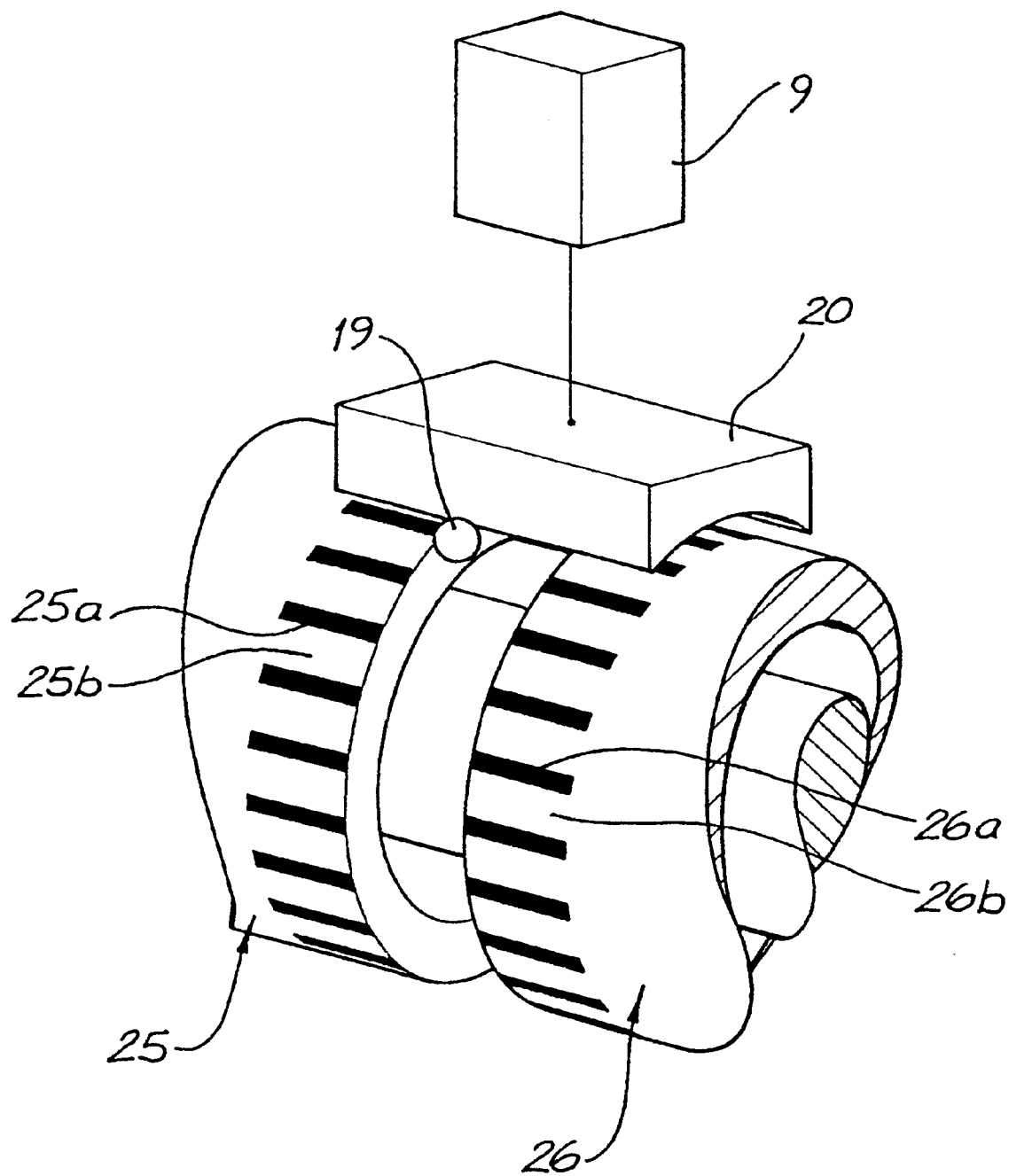
FIG. 9 shows details of the grating elements of the torque transducer shown in FIG. 8.

FIGS. 8 and 9 show a third embodiment of the present invention. Cylindrical grating elements 25 and 26, each comprising a substantially smooth cylindrical surface with alternating regions of high and low reflectivity, are respectively attached to torque input members 1a and 1b, which in turn are connected to either end of torsion bar 2. This assembly is enclosed in housing 10 and supported by bearings 11 and 12. A metallised coating, or other shiny or light coloured material or surface treatment, provides substantially axially aligned regions of high reflectivity, 25a and 26a. A substantially transparent, roughened or dark coloured material or surface treatment provides the, interspaced regions of low reflectivity 25b and 26b. EMR source 19 is arranged to illuminate both surfaces, and the array 20 of detectors receives incident EMR from the surfaces and the pattern thus generated on the array is processed by processor 9 to provide a measurement of torque. Failsafe mechanism 15, shown in cross section in FIG. 7, limits the maximum torque carried by the torsion bar 2 as described earlier.

Figure 10:
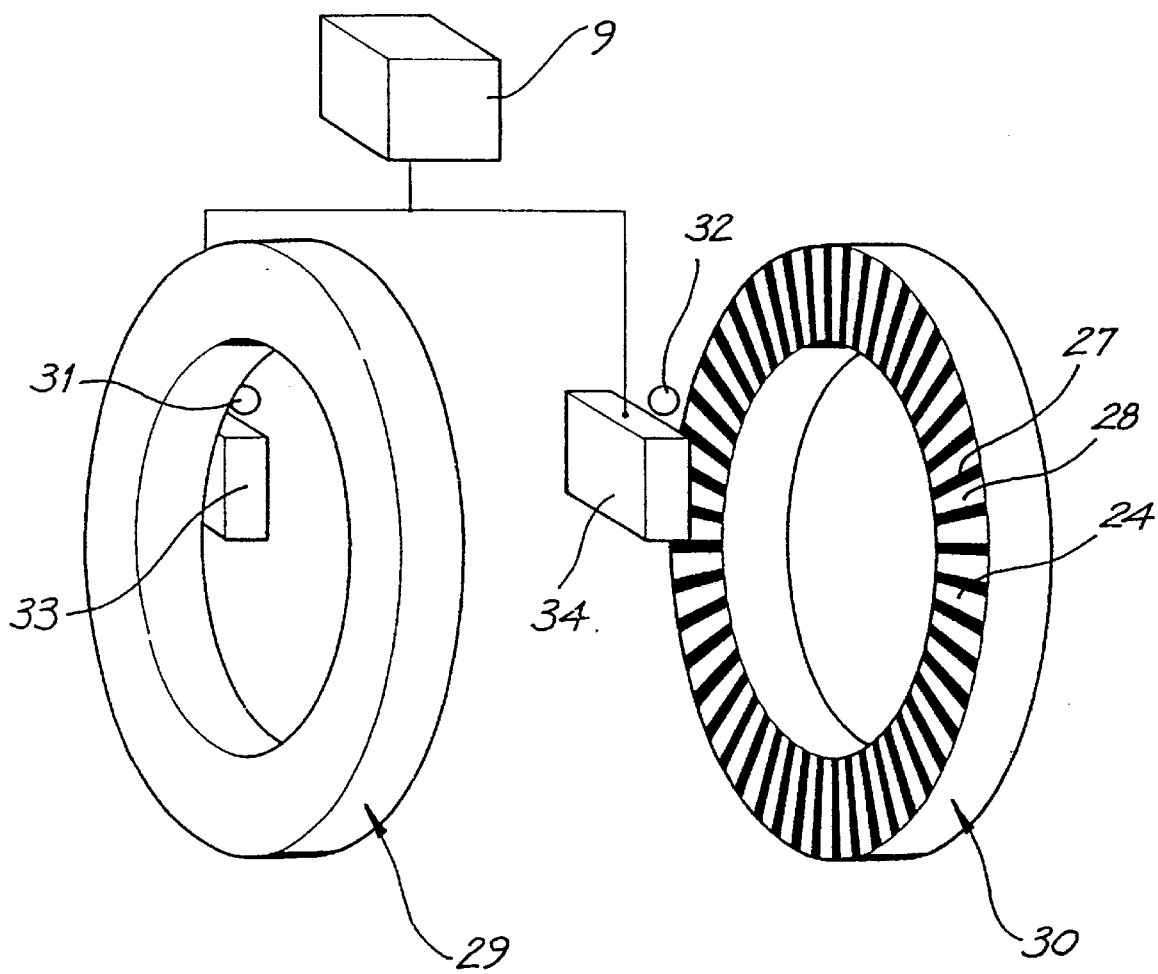
FIG. 10 is a diagrammatic view similar to FIG. 1 but showing grating elements with radially disposed surfaces.
Figure 11:
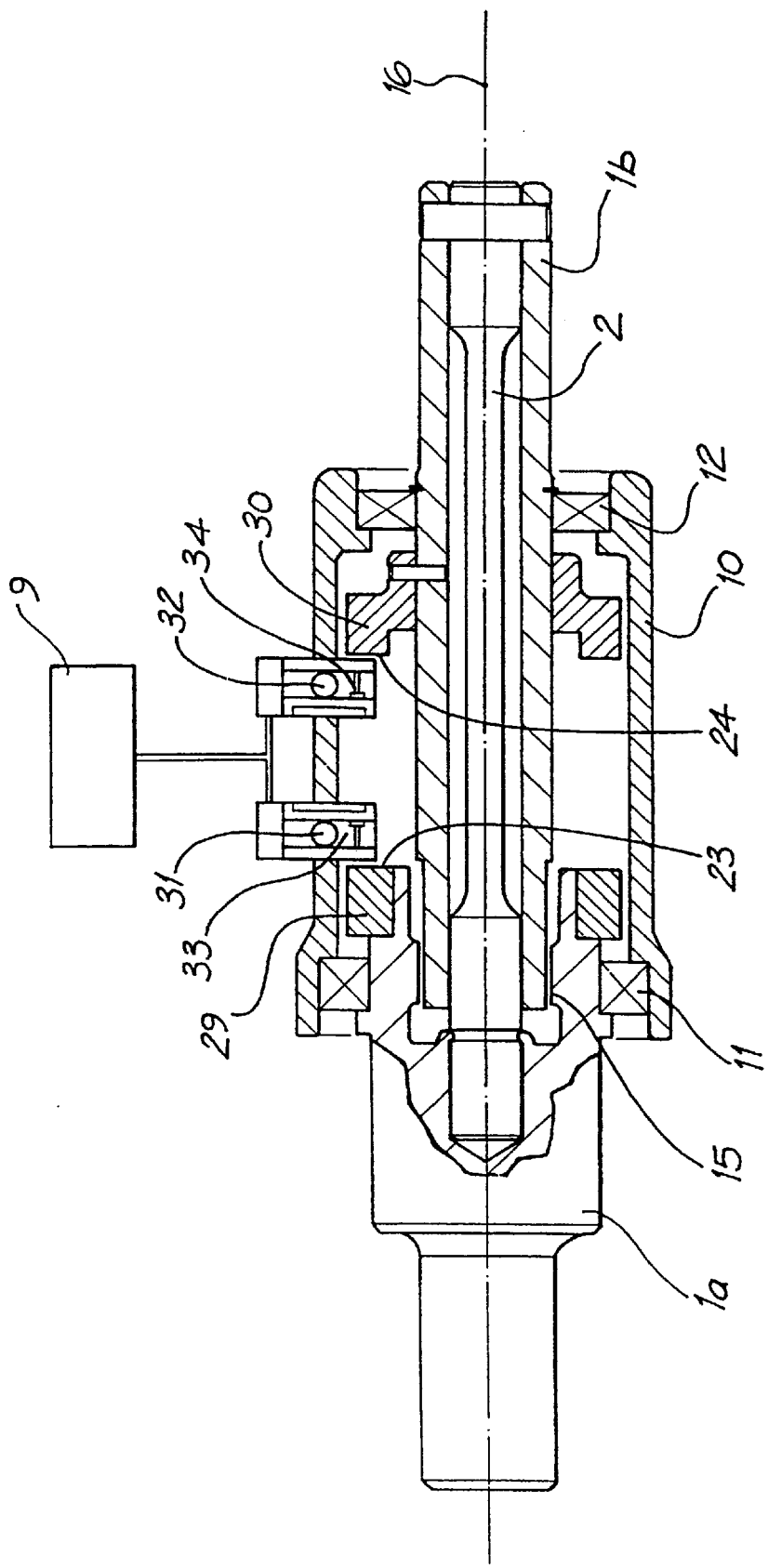
FIG. 11 is a cross section of torque transducer according to a fourth embodiment of the present invention, based on the concept shown in, FIG. 10.

FIGS. 10 and 11 show a fourth embodiment of the present invention. Grating elements 29 and 30, again respectively attached to torque input members 1a and 1b, incorporate continuous, radially disposed surfaces 23 and 24. These radially disposed surfaces are arranged perpendicular to, and have a mutual central axis collinear with, axis of rotation 16. Each surface comprises substantially radially disposed alternating regions of high and low reflectivity 27 and 28 respectively. Grating elements 29 and 30 are surrounded by housing 10 and the assembly carried in bearings 11 and 12. EMR sources 31 and 32 are disposed to illuminate the surfaces. Arrays 33 and 34 of detectors receive incident EMR from the surfaces and the patterns thus generated on the arrays are processed by processor 9. When torque is applied between torque input members 1a and 1b, torsion bar 2 angularly deflects, resulting in a displacement of one pattern with. respect to the other. Failsafe mechanism 15, shown in cross section in FIG. 7, limits the maximum torque carried by the torsion bar 2 as described earlier.

Figure 12:
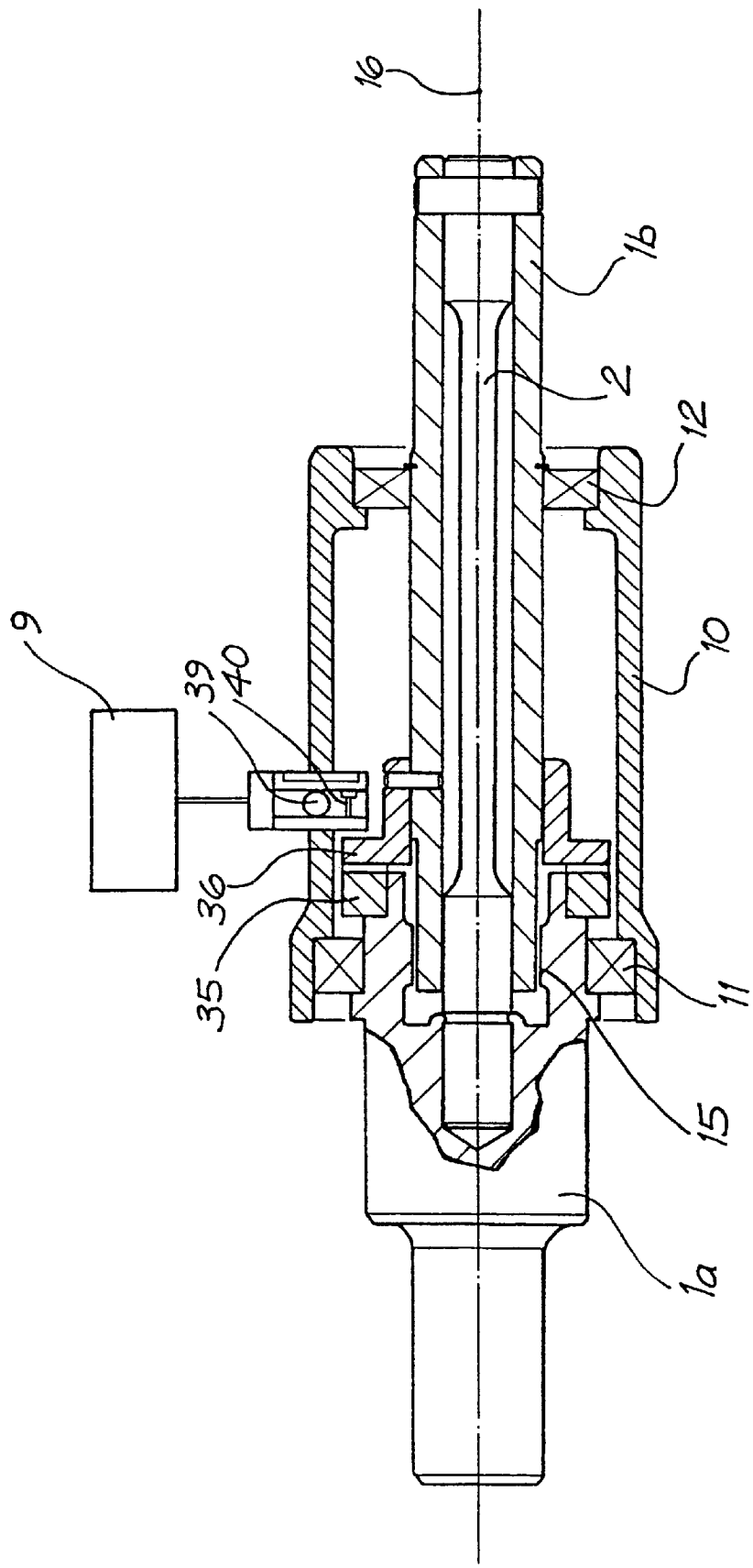
FIG. 12 is a cross section of a torque transducer according to a fifth embodiment of the present invention employing axially protruding, rather than radially protruding, castellations.
Figure 13:
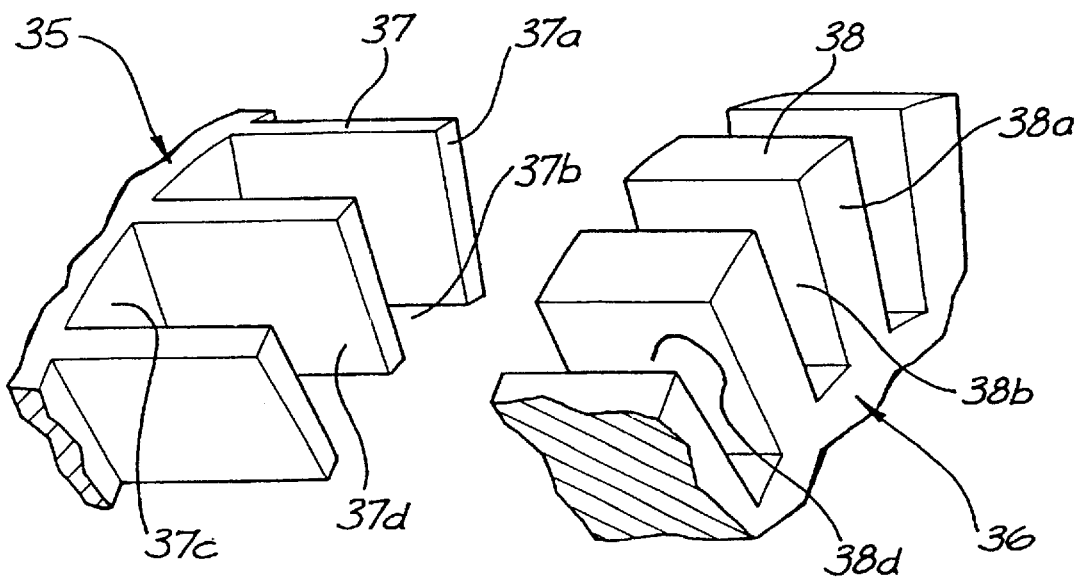
FIGS. 13 and 14 show exploded and assembled isometric views respectively of the axially protruding interdigital castellations shown on FIG. 12.
Figure 14:
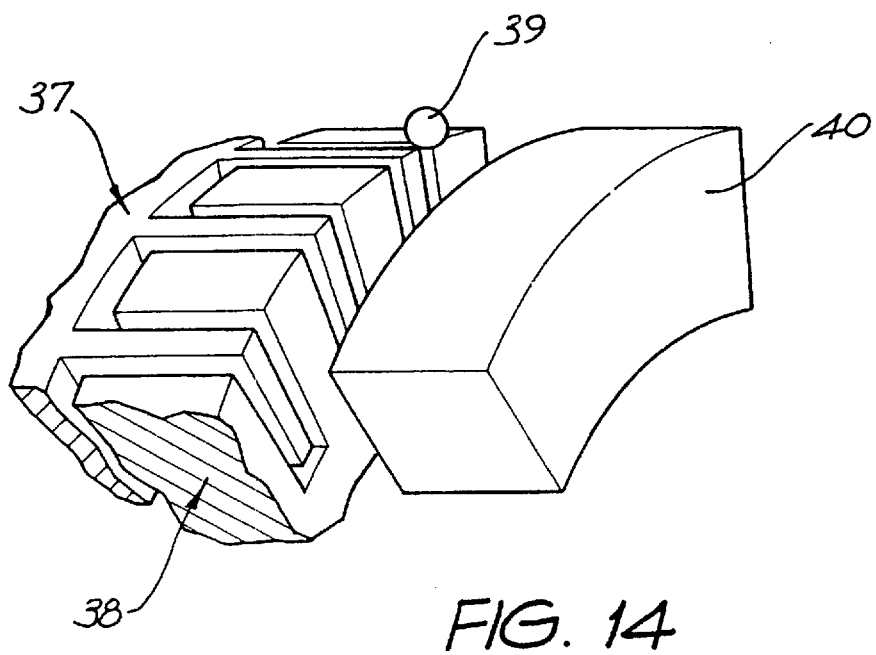

FIGS. 12, 13 and 14 show a fifth embodiment of the present invention. Grating elements 35 and 36 comprise radially disposed surfaces arranged perpendicular to, and having a mutual central axis collinear with, axis of rotation 16. The surfaces are formed by axially protruding castellations 37 and 38 respectively, the regions of high reflectivity provided by the areas of maximum axial, protrusion 37a and 38a of castellations 37 and 38, and the regions of low reflectivity angularly aligned with the discontinuous gap areas 37b and 38b between the castellations. The root areas 37c and sides 37d of castellations 37, and also the sides 38d of castellations 38, have lesser axial protrusion than regions 37a and 38a and are machined, moulded or sintered, or surface treated with paint or material deposition to impart low reflectivity. The grating elements are interdigitally meshed, as shown in FIG. 14. This assembly is enclosed in housing 10 and supported by bearings 11 and 12. An EMR source 39 is arranged to illuminate the surfaces, and an array 40 of detectors receives incident EMR reflected from the surfaces. The pattern thus generated on array 19, therefore comprising interdigitally disposed subpatterns generated by incident EMR reflected from regions 37a and 38a respectively, is processed by the processor 9 to provide a measurement of torque. Failsafe mechanism 15, shown in cross section in FIG. 7, limits the maximum torque carried by the torsion bar 2 as described earlier.

Figure 15:
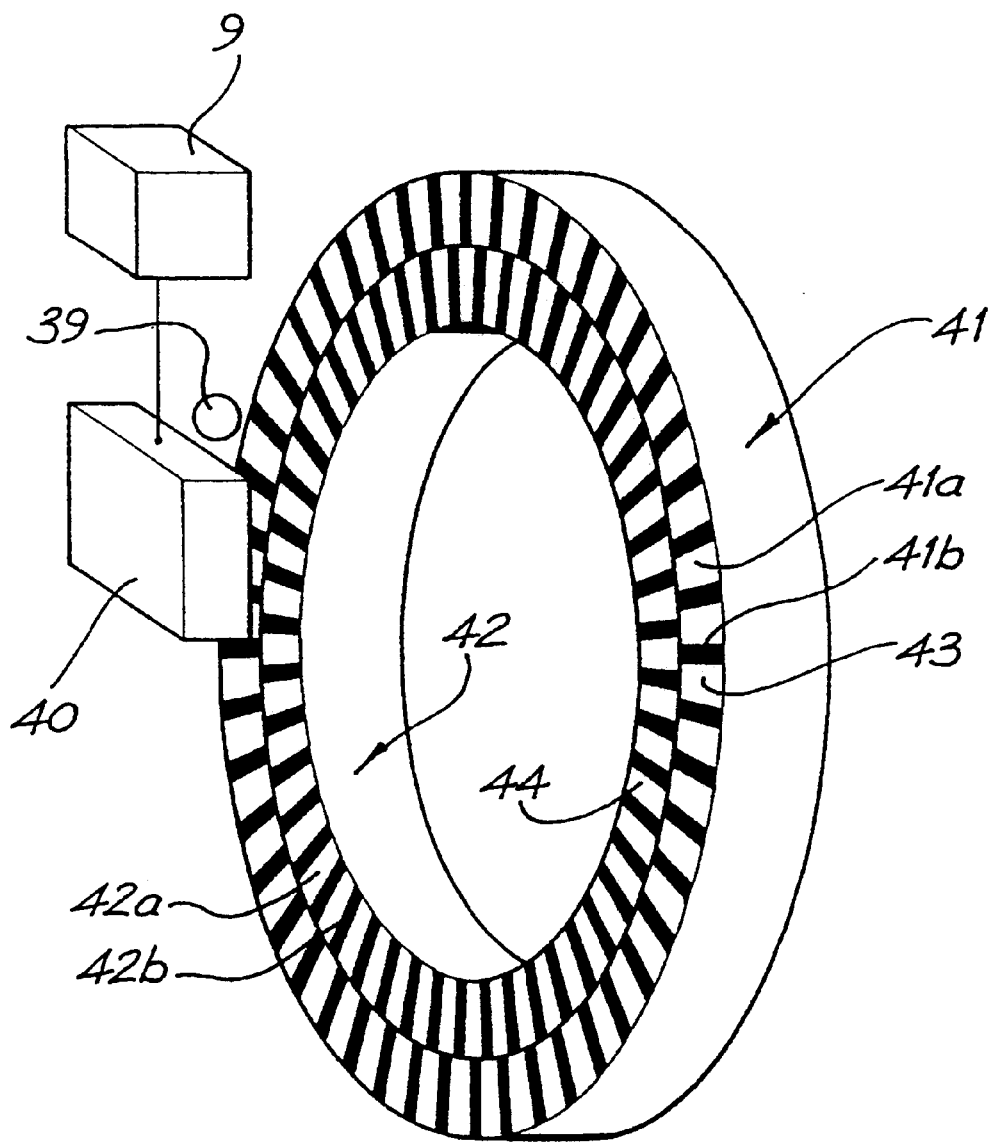
FIG. 15 is a diagrammatic view of two input torque members and attached grating elements with radially disposed surfaces.
Figure 16:
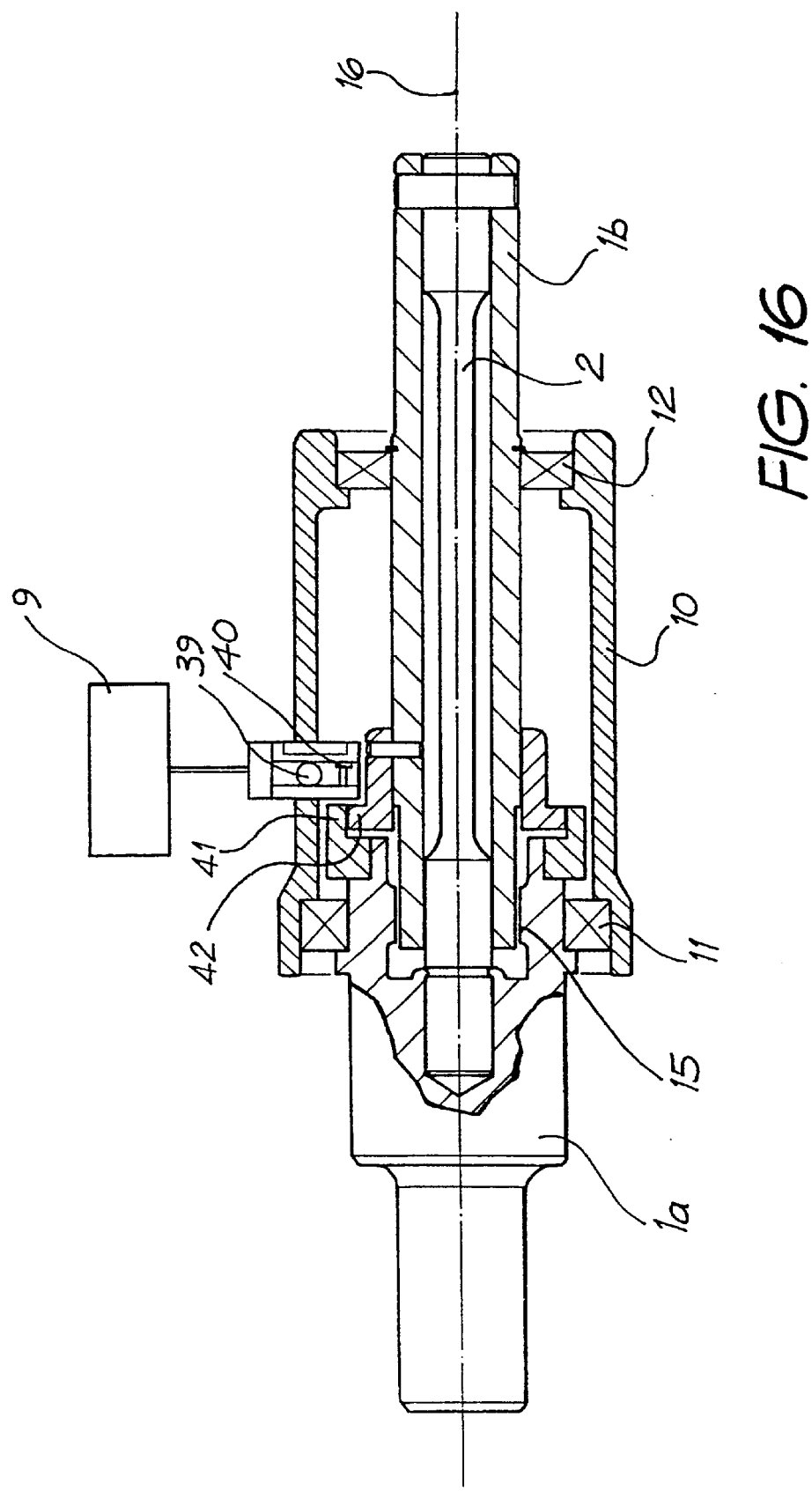
FIG. 16 is a cross section of a torque transducer according to a sixth embodiment of the present invention, based on the concept shown in FIG. 15, FIGS. 17 an 18 show exploded and assembled perspective views respectively of interdigitally meshed grating elements comprising castellations which also provide a failsafe mechanism.

FIGS. 15 and 16 show a sixth embodiment of the present invention. Grating elements 41 and 42, again attached to torque input members 1a and 1b respectively, incorporate continuous radially disposed surfaces 43 and 44. These radially disposed surfaces are substantially coplanar and concentric with respect to axis of rotation 16. Each surface is smooth and incorporates substantially radially disposed alternating regions of high and low reflectivity. A metallised coating, or other shiny or light coloured material or surface treatment, provides the regions of high reflectivity 41a and 42a. A substantially transparent, roughened or dark coloured material or surface treatment provides the regions of low reflectivity 41b and 42b. EMR source 39, array 40 of detectors and processor 9 are used to generate a measurement of torque.

Figure 17:
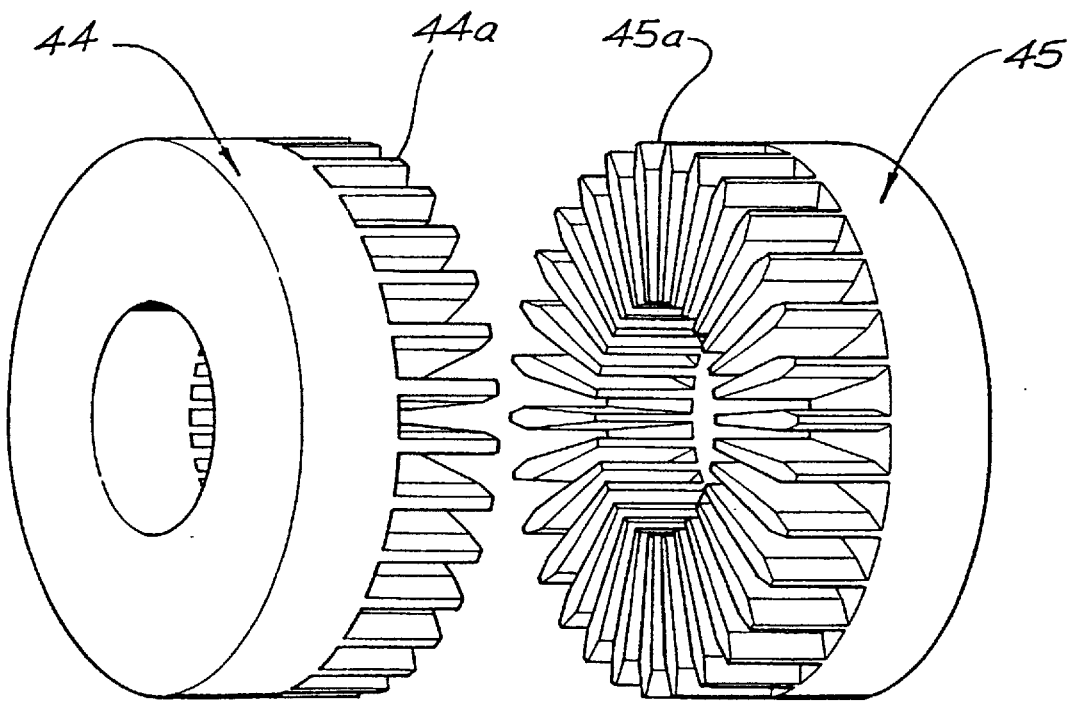
Figure 18:
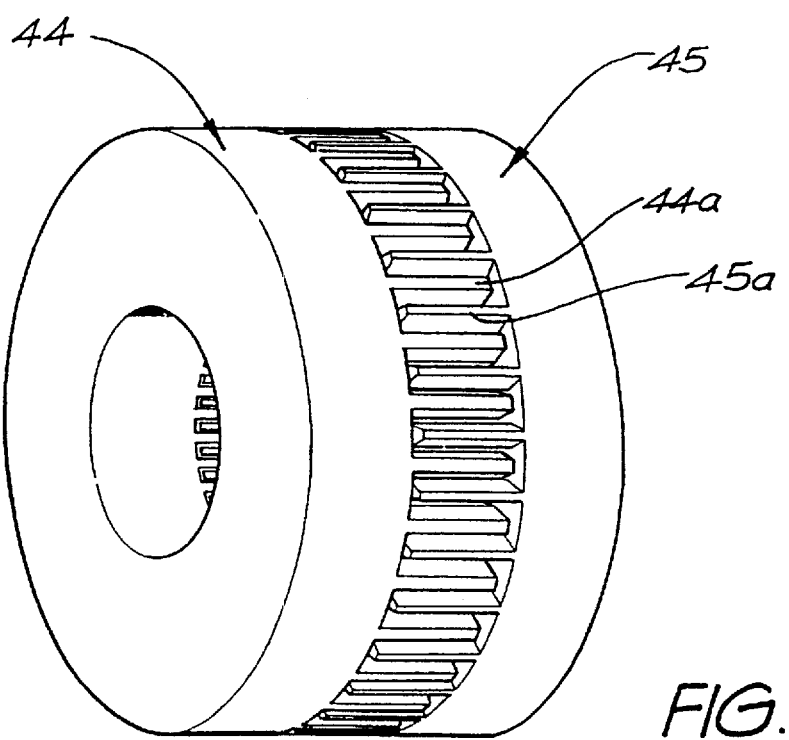

FIGS. 17 and 18 show an alternative version of the second embodiment of the present invention (refer back to FIGS. 4, 5 and 6). Two grating elements 44 and 45 are adjacent and comprise radially extending intermeshing castellations 44a and 45a which provide a measurement of torque similar to that described in reference to grating elements 21 and 22 of the second embodiment. The clearance provided between castellations 44a and 45a provides a rotational lost motion connection between the first and second torque input-members and hence limits the maximum angular deflection of torsion bar 2. When the torque applied between torque input members 1a and 1b reaches a predetermined maximum value in either direction, castellations 44a and 45a contact, providing an alternate torsional load path to the torsion. bar 2, thus allowing elimination of failsafe mechanism 15 by providing the same function.

Figure 19:
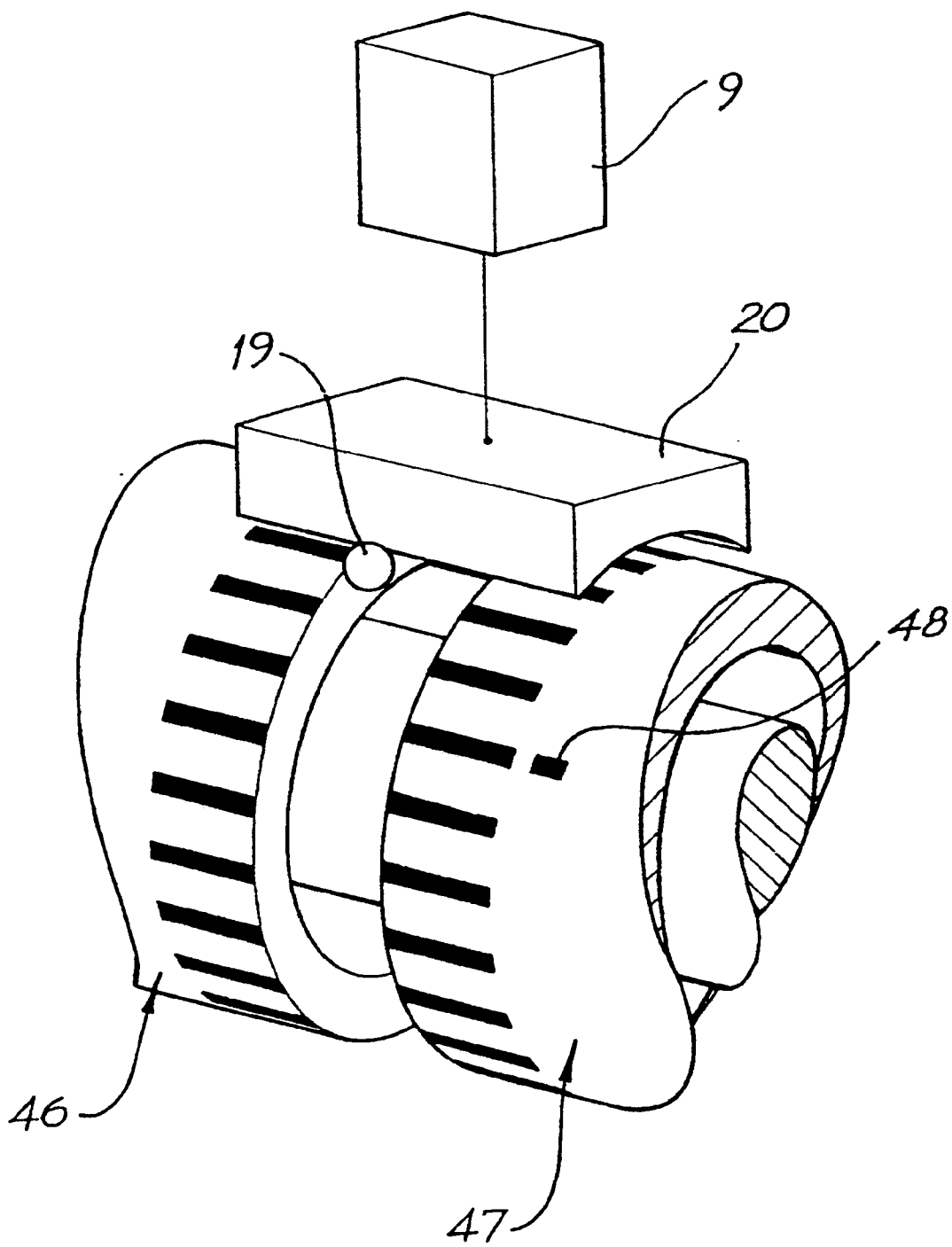
FIG. 19 shows an alternative version of the third embodiment of the present invention allowing also the measurement of absolute angular position of one of the. torque input members.

FIG. 19 shows an alternative version of the third embodiment of the present invention (refer back to FIGS. 8 and 9), however it should be noted that this same concept could be readily applied to any of the embodiments disclosed in this specification. Two grating elements 46 and 47 comprise cylindrical surfaces composed of alternating regions of high and low reflectivity, similar to those as shown in FIGS. 8 and 9. In addition to these regions, at least one additional "home mark" region 48 (or, alternatively not shown, an axially lengthened existing region) of high or low reflectivity is added to one of the surfaces at a predetermined angular position. EMR source 19 is arranged to illuminate both surfaces, and array 20 of detectors receives incident EMR from the surfaces and the patterns thus generated on the array is processed by the processor 9 to provide a measurement of torque and also absolute angular position of the torque input member to which the relevant grating element is attached to or integral with.

FIGS. 20–25 show typical patterns produced by incident EMR on the various array combinations according to the present invention. Note that, for illustration in all these figures, the black-rendered portions correspond to highly illuminated portions of the patterns while the non-rendered (ie. white) portions correspond to low (or essentially non) illuminated portions of the patterns.

Figure 20B:
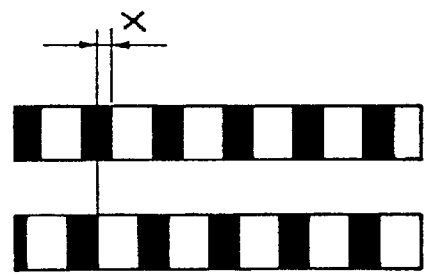
FIG. 20b shows typical patterns produced on the first and second arrays according the first embodiment of the present invention, where these arrays are one dimensional arrays.
Figure 20A:
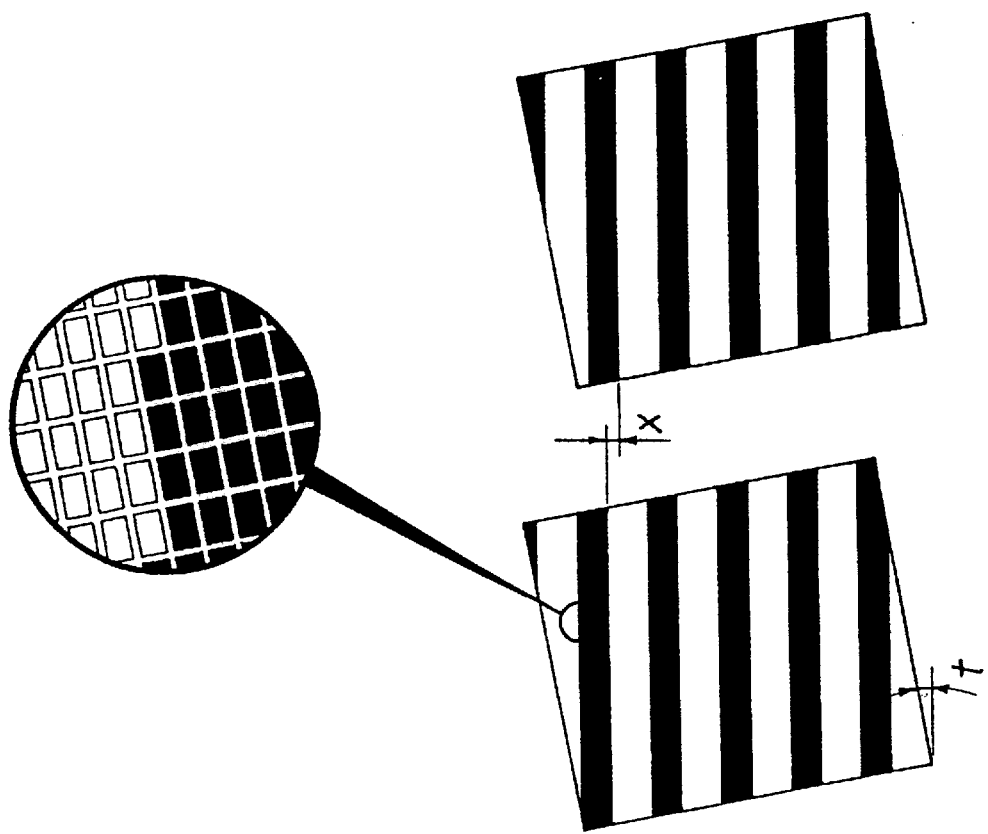
FIG. 20a shows typical patterns produced on the first and second arrays according the first embodiment of the present invention, where these arrays are two dimensional arrays.

FIGS. 20a and 20b show typical patterns produced by incident EMR on first and second arrays according to the first embodiment of the present invention. In FIG. 20a the arrays are two dimensional arrays, and for example each incorporate a Texas Instruments TC277 Black & White CCD Image Sensor with 699×288 pixels and an active window size of approximately 8 mm×6 mm. The methods by which the patterns are processed are generally well known in the art of image analysis, and some of these methods used are described in "Vision Chips Implementing Vision Algorithms with Analog VLSI Circuits", by Christof Koch and Hua Li, IEEE Computer Society Press, ISBN 0-8186-6492-4. In order to improve edge delineation, it is seen in FIG. 20a that the arrays are mounted at a small angle 't' (typically less than 15 deg.) with respect to the respective patterns. This misalignment produces more information relating to the edge position since the pattern no longer "beats" with the pixel alignment of the array and regression techniques are therefore more accurate due to an increased amount of data. Dimension is 'x', being the average relative displacement between the patterns on the two arrays, relates directly to the relative angular displacement of the two grating elements and henceto shaft torque. In FIG. 20b the arrays are one dimensional arrays, and for example each incorporate a Texas Instruments TSL1410 Black & White Linear Array chip with 128 pixels and an active window length of approximately 8 mm. Dimension 'x' is measured similarly however, without the benefits of improved edge delineation provided by the above mentioned two dimensional arrays. In the case of all embodiments of the arrays described in this specification, a lens (for example spherical, aspherical, or Fresnel) or a fibre optic array light guide is incorporated in front of the EMR sensitive detectors in order that the incident EMR is focused as a sharp pattern and any spurious cross-reflection is minimised.

FIGS. 21a and 21b show typical patterns produced by incident EMR on a single array according to the second embodiment of the present invention. In FIG. 21a the array is a two dimensional array as described above. Dimension '(x−y)/2', being the average relative displacement between the interdigitally disposed wide and narrow subpatterns 50 and 51 respectively, relates directly to the relative angular displacement of the two grating elements and hence to shaft torque. FIG. 21b shows the pattern in the case of a one dimensional array as described above. Dimension '(x−y)/2' can be measured similarly and the appropriate recognition and processing aspects are well described in International Patent Application PCT/GB95/02017.

FIG. 22 shows a typical pattern produced by incident; EMR on a single two dimensional array according to the third embodiment of the present invention. Again dimension '(x−y)/2', being the average relative displacement between the two laterally separated subpatterns 52 and 53, relates directly to the relative angular displacement of the two grating elements and hence to shaft torque.

Figure 23A:
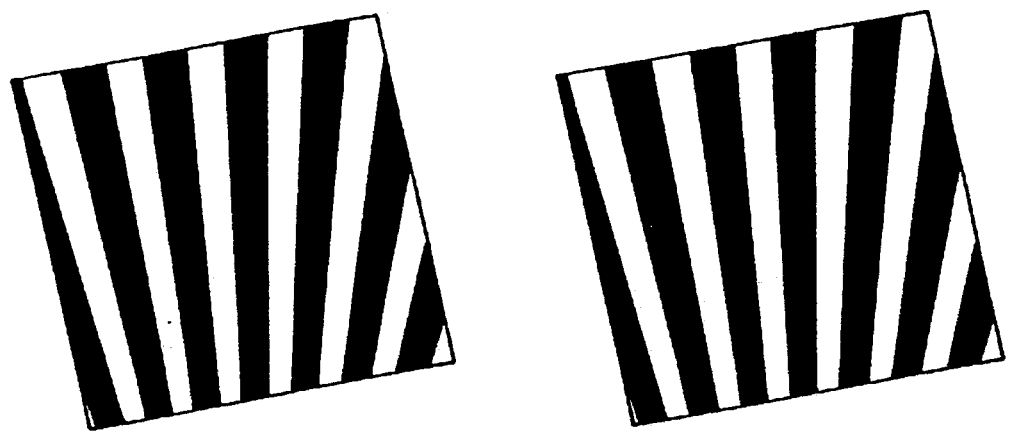
FIG. 23a shows typical patterns produced on the first and second arrays according to the fourth embodiment of the present invention, where these arrays are two dimensional arrays.
Figure 23B:
FIG. 23b shows typical patterns produced on the first and second arrays according to the fourth embodiment of the present invention, where these arrays are one dimensional arrays.

FIGS. 23a and 23b show typical patterns produced by incident EMR on first and second arrays according to the fourth embodiment of the present invention. Of course the patterns in this case are substantially radially disposed rather than parallel as in the case of the first embodiment shown in FIGS. 20a and 20b, still the basic methodology for determination of dimension 'x', and, hence shaft torque, is similar for both cases of the arrays being two dimensional or one dimensional.

FIG. 24a and 24b show typical patterns produced by incident EMR on a single array according to the fifth embodiment of the present invention. Apart from the wide and narrow interdigitally disposed subpatterns 54 and 55 being substantially radially disposed, rather than parallel as in the case of the second embodiment shown in FIGS. 21a and 21b, the basic methodology for determination of dimension '(x−y)/2', and hence shaft torque, is similar for both cases of two dimensional and one dimensional arrays.

FIG. 25 shows a typical pattern produced by incident EMR on a single two dimensional array according to the sixth embodiment of the present invention. Dimension '(x−y)/2', being the average relative displacement between the two radially separated subpatterns 56 and 57, relates directly to the relative angular displacement of the two grating elements and hence to shaft torque.

For all six embodiments described above the pattern migrates across the limited width one dimensional or two dimensional array(s) as the shaft rotates, quite independent of shaft torque. Again, using techniques well known in the discipline of pattern recognition, the rate of pattern migration arid the total displacement of the pattern can be calculated providing a measure of the angular velocity and relative angular position of the torque input members. A "home mark" on the surface of one of the grating elements, as described in reference to FIG. 19, can be used as an absolute angular position reference. The intervening marks can be counted from this home mark position by the processor to provide a measurement of absolute angular position of the torque input member to which the relevant grating element is attached to or integral with.

FIGS. 26a–e show details of the regions of high and low reflectivity on the cylindrical surfaces of grating elements 58 and 59, according to another alterative version of the third embodiment of the present invention (refer back to FIGS. 8 and 9). These regions are arranged in the form of a succession of 120 individual non-overlapping binary bar codes 60a–g . . . . and 61a–g . . . . on the periphery of each of the grating elements 58 and 59 respectively. These 120 bar codes are disposed at a uniform 3 degree angular spacing on the periphery of each grating element.

Figure 27:
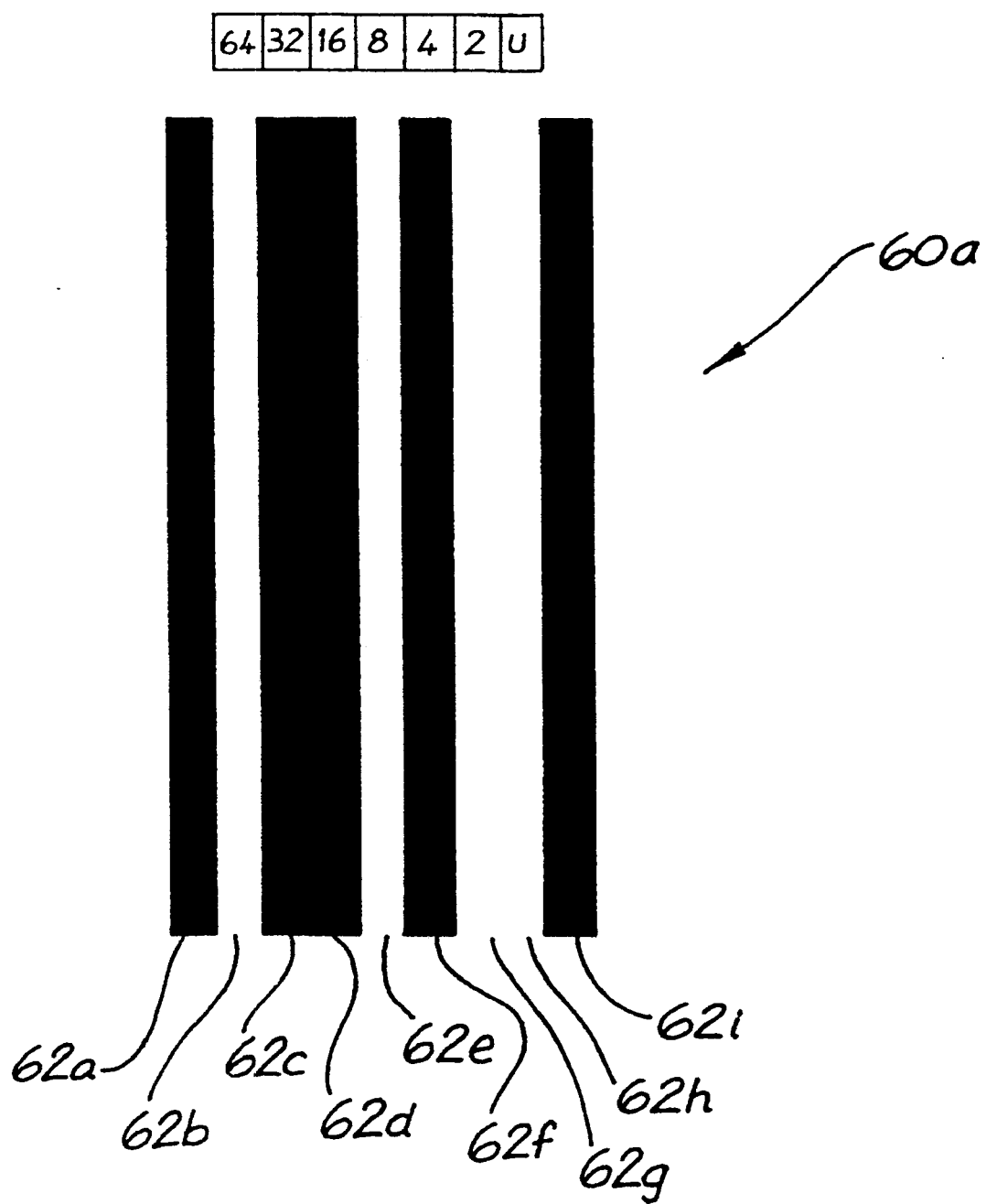
FIG. 27 shows details of the regions of high and low reflectivity on one of the binary bar codes shown in FIGS. 26a–e, FIGS. 28a and 28b show successive relative positions of the grating elements for yet another alternative version of the third embodiment of the present invention allowing also the measurement of absolute angular position of the torque input members.

FIG. 27 shows details of bar code 60a on grating element 58, in order to better describe the bar code format. Each bar code comprises 9 bars in total; one "start" bar 62a, seven "angle position" bars 62b–h, and one "stop" bar 62i. In this embodiment start bar 62a and stop bar 62i are always regions of high reflectivity whereas interposed angle position bars are either regions of high or low reflectivity depending on the binary value of the angle position value to be encrypted. For example bar code 60a comprises regions of high reflectivity in the form of bars 62c, 62d, and 62f and regions of low reflectivity in the form of bars 62b, 62e, 62g and 62h. Bar code 60a therefore has a binary value of 0110100 or an angle position value of 52 (base 10). The use of seven angle position bars enables theoretically the encryption of up to 128 discrete angle position values which is necessary to encompass and individually identify each of the 120 barcodes on 5 each grating element.

Figure 26A:
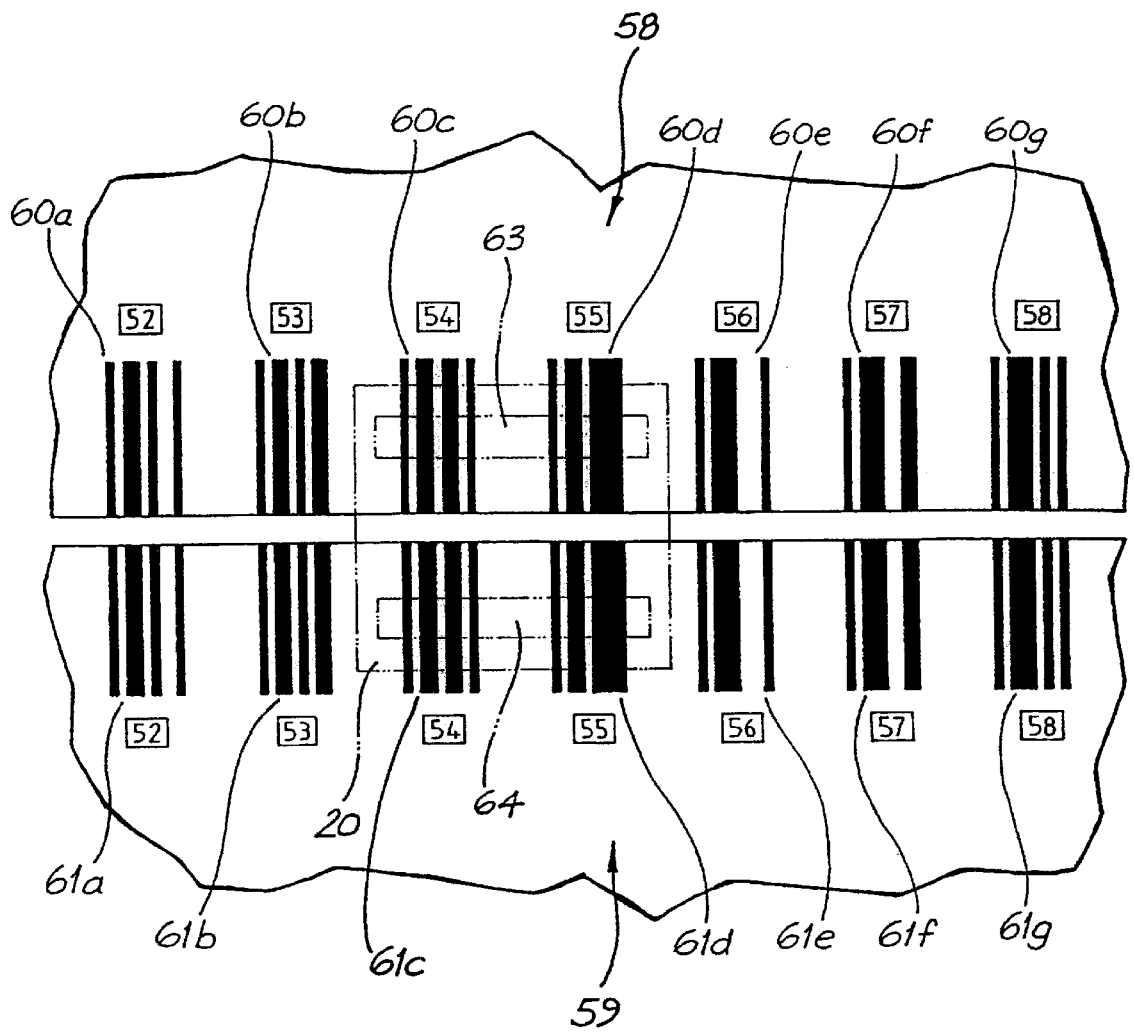
FIGS. 26a–e show successive relative positions of the grating elements for another alternative version of the third 6 embodiment of the present invention allowing also the measurement of absolute angular position of the torque input members.
Figure 26B:
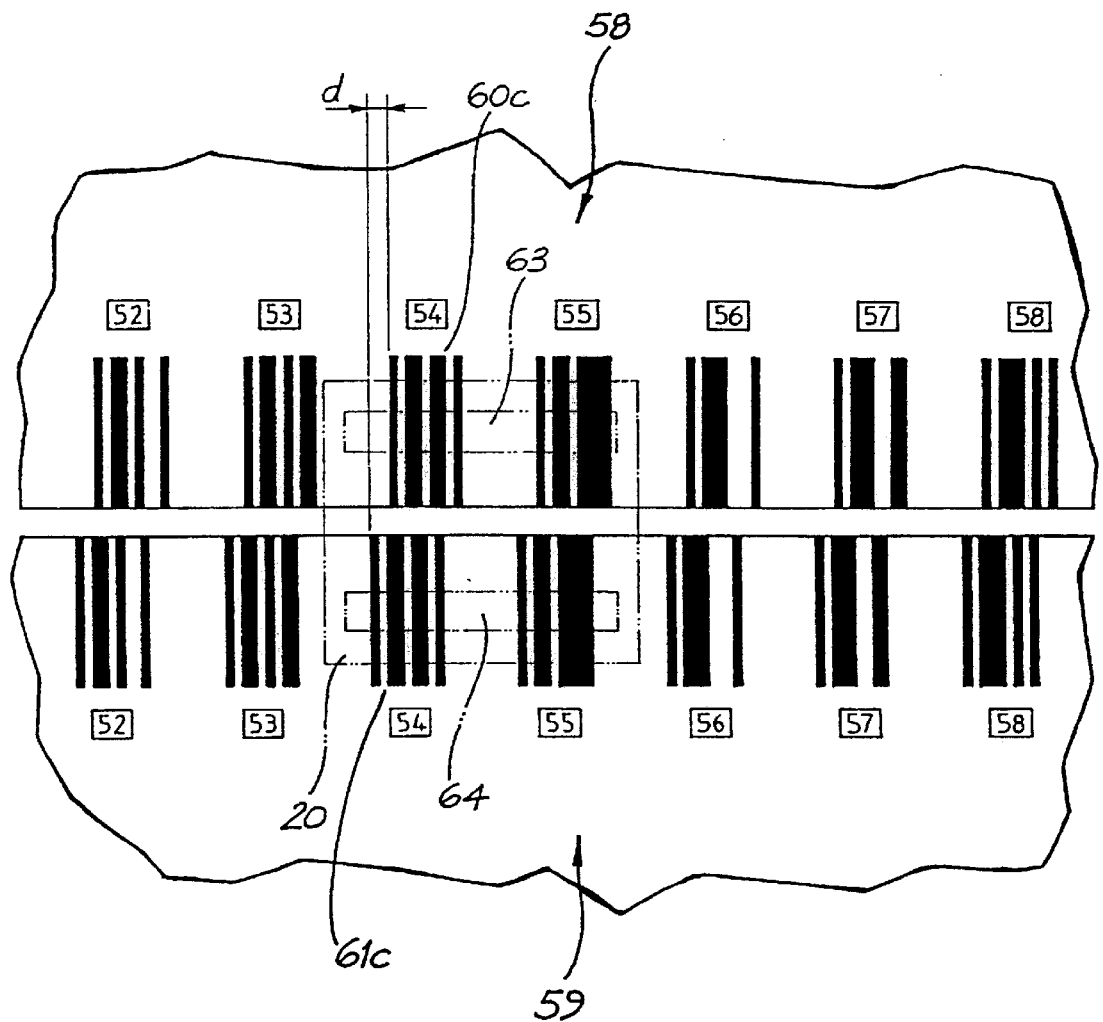
Figure 26C:
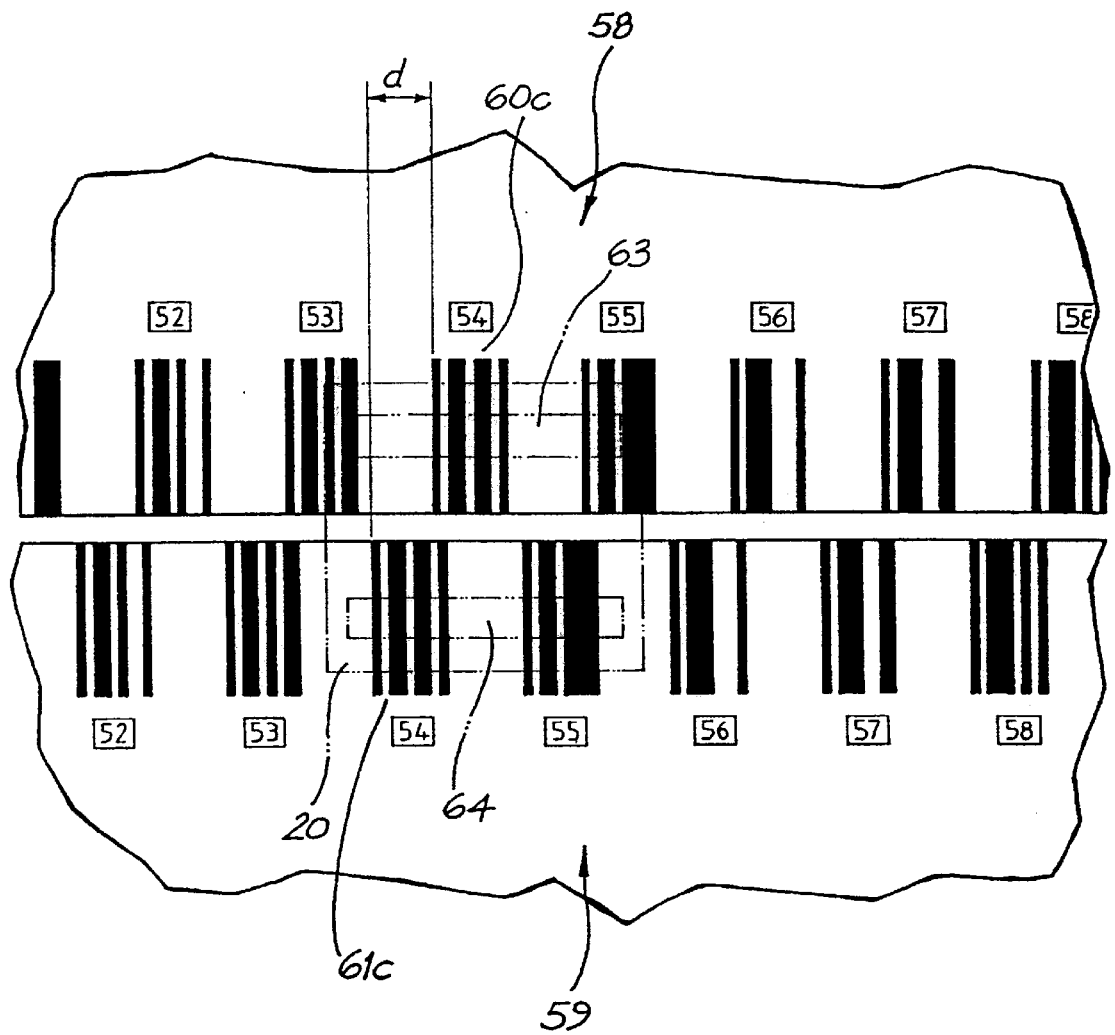
Figure 26D:
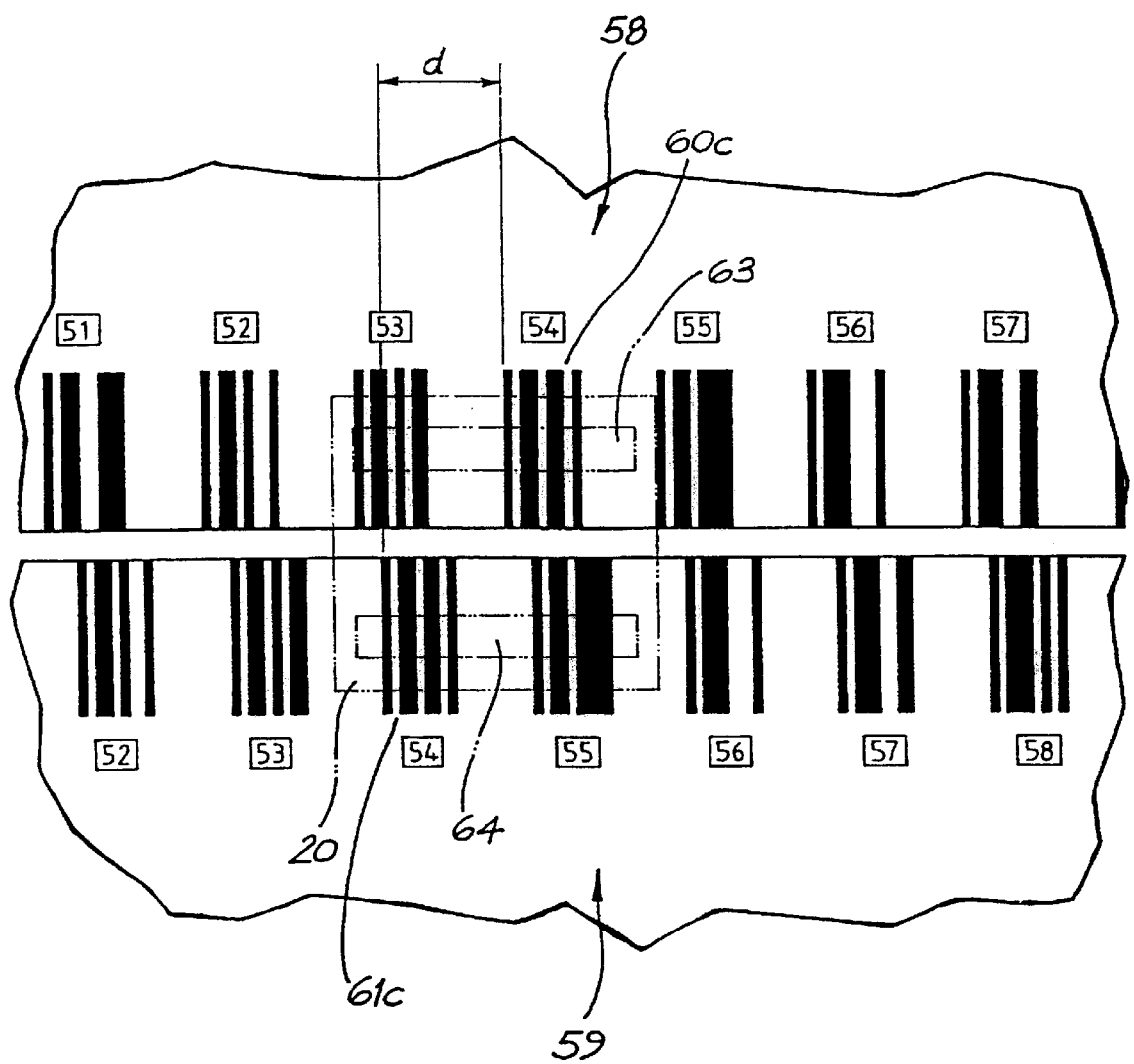

FIG. 26a shows the position of grating elements 58 and 59 when zero torque is applied to torque input members 1a and 1b (refer back to FIG. 8). It is seen that ,bar codes 60a and 61a, both corresponding to angle position value of 52 on grating elements 58 and 59 respectively, are mutually aligned for this zero torque condition. The same is true for all other 119 bar code pairs 60b and 61b, 60c and 61c, etc. The method of manufacturing of such successions of bar codes on grating elements and accurately mutually aligning them at the zero torque condition, is described in a co-pending Australian Provisional Pat. No. Application entitled "Method For Manufacture of Optical Torque Transducers".

FIGS. 26b–e show successive relative angular displacements of grating elements 58 and 59 as an increasing anticlockwise torque is applied to torque input member 1b with respect to torque input member 1a. The viewing window of two-dimensional array 20 is also shown superimposed as dotted lines in these diagrams. Note that this viewing window is chosen to be sufficiently large to always capture at least one complete bar code from each of the two grating elements, irrespective of the relative angular displacement of the two grating elements (as a function of input torque) and the absolute rotation angle of the grating elements over their 360 degree possible range (as a function of steering angle). In order to reduce total silicon usage (and hence cost), two separate one-dimensional (ie. linear) arrays or smaller elongated two-dimensional arrays 63 and 64 could be used instead of the larger two dimensional array 20. In certain VLSI vision chip configurations, array 20 or arrays 63 and 64 may be embedded in, attached to, or integrated as part of, the microprocessor chip used to carry out the necessary processing, that is processor 9.

Array 20 (or arrays 63 and 64) receive incident EMR reflected from the regions of high reflectivity on the surfaces of grating elements 58 and 59 which are instantaneously in the array's (or arrays) viewing window. In the example shown in FIGS. 26b–d, array 20 (or arrays 63 and 64) receive incident EMR from bar codes 60c and 61c and processor 9 is therefore able to derive relative displacement distance 'd' of the peripheries of respective grating elements 58 and 59 and hence a measure of input torque.

Figure 28A:
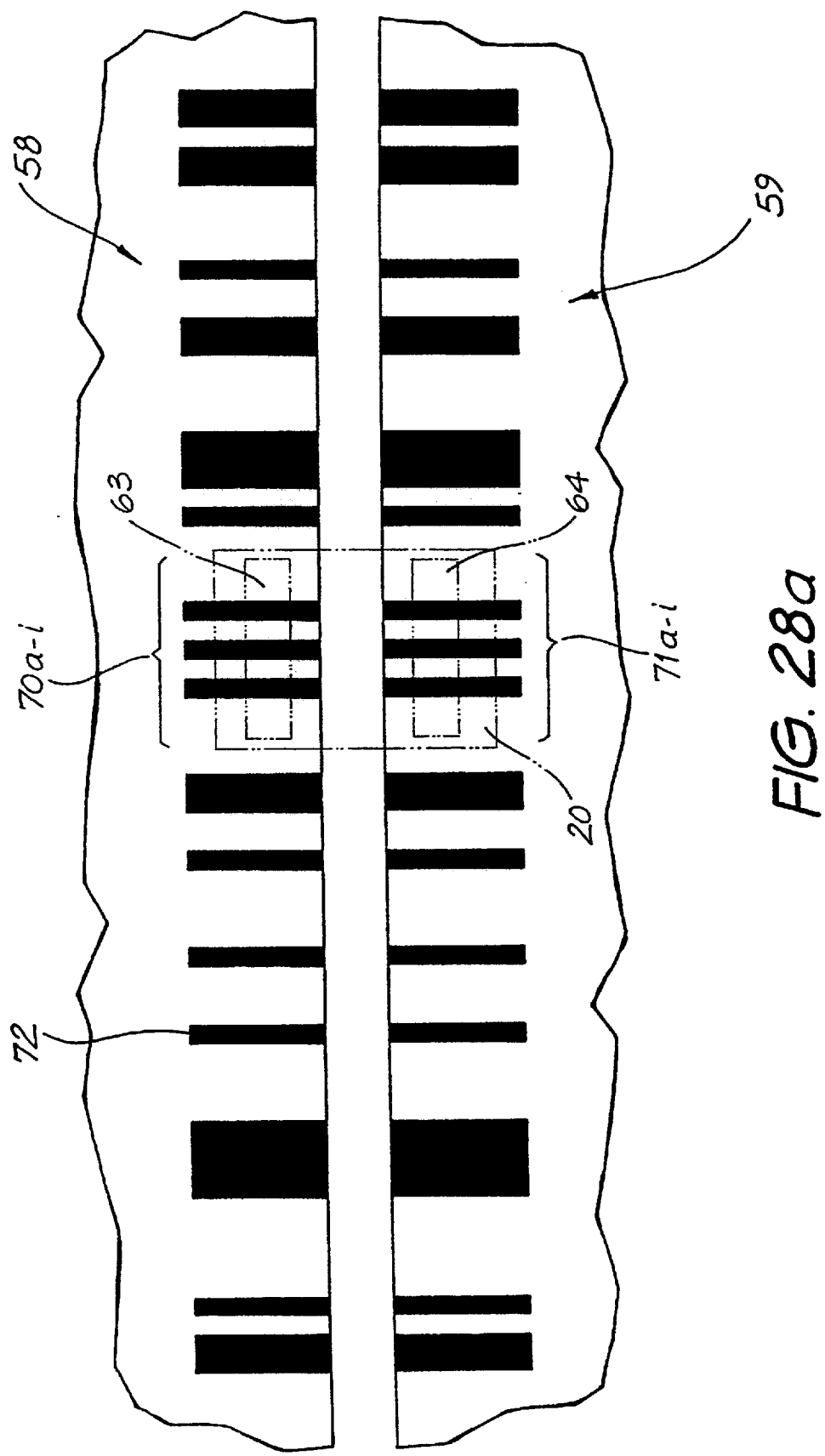
Figure 28B:
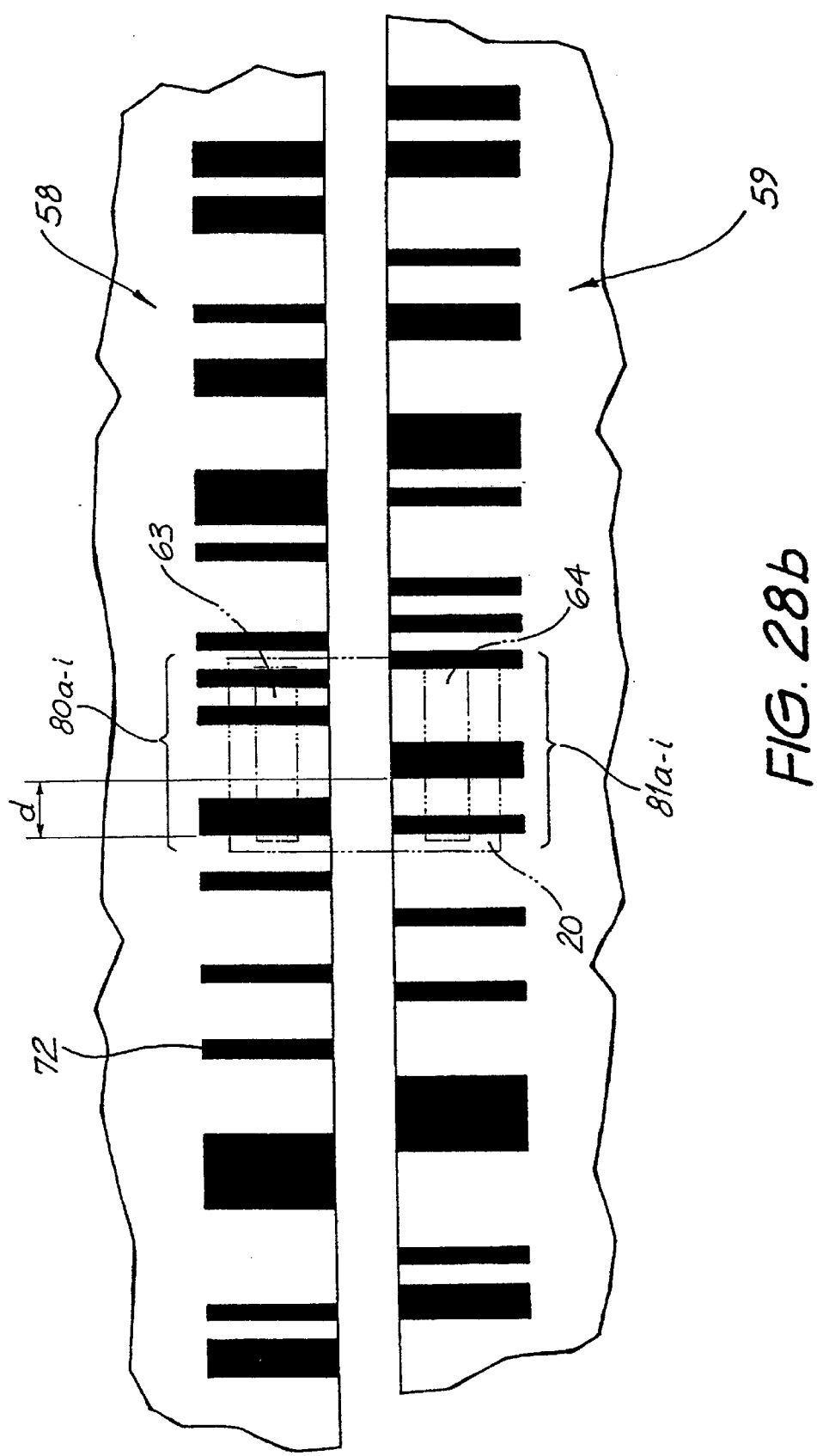

FIGS. 28a and 28b show the position of grating elements 58 and 59 for two successive relative positions, according to another alternative version of the third embodiment of the present invention (refer back to FIGS. 8 and 9). Zero torque is applied to torque input members 1a and 1b (refer back to FIG. 8) in the case of FIG. 28a. FIG. 28b shows the situation of a torque applied to torque input members 1a and 1b producing a relative displacement 'd' of the, peripheries of respective grating elements 58 and 59. These regions are arranged in the form of a succession of 512 individual 9 bit binary bar codes is 70a–i . . . and 71 a–i . . . on the periphery of each of the grating elements 58 and 59 respectively. An example of one combination of such bar codes is described as an Ouroborean ring in "Game, Set and Math" by Ian Stewart, Penguin Books, 1989. These 512 bar codes overlap and are disposed at a circumferential spacing equal, to an integer multiple of the width of one of the bars 72 on the periphery of each grating element. In the embodiment shown, this multiple is unity, and the spacing is equal to the width of one of the bars. The viewing window of two-dimensional array 20 is also shown superimposed as dotted lines in these diagrams. In order to reduce total silicon usage (and hence cost), two separate one-dimensional (ie. linear) arrays or smaller elongated two-dimensional arrays 63 and 64 could be used instead of the larger two dimensional array 20. In certain VLSI vision chip configurations, array 20 or arrays 63 and 64 may be embedded in, attached to, or integrated as part of, the microprocessor chip used to carry out the necessary processing, that is processor 9. Array 20

(or arrays 63 and 64) receive incident EMR reflected from the regions of high reflectivity on the surfaces of grating elements 58 and 59 which are instantaneously in the array's (or arrays) viewing window. As shown in FIG. 28b, array 20 (or arrays 63 and 64) receive incident EMR from bar codes 80a–i and 81a–i and processor 9 is therefore able to derive relative displacement distance 'd' of the peripheries of respective grating elements 58 and 59 and hence a measure of input torque. In the situation shown in FIG. 28b, the grating elements 58 and 59 have also net-rotated from the position shown in FIG. 28a, causing the array 20 (or arrays 63 and 64) to receive incident, EMR from bar codes 80a–i and 81a–i, which are displaced from (but still overlap) bar codes 70a–i and 71a–i. Note that the viewing window is chosen to be sufficiently large to always capture at least one complete bar code from each of the two grating elements, irrespective of the relative angular displacement of the two grating elements (as a function of input torque) and the absolute rotation angle of the grating elements over their 360 degree possible range (as a function of steering angle).

Figure 29:
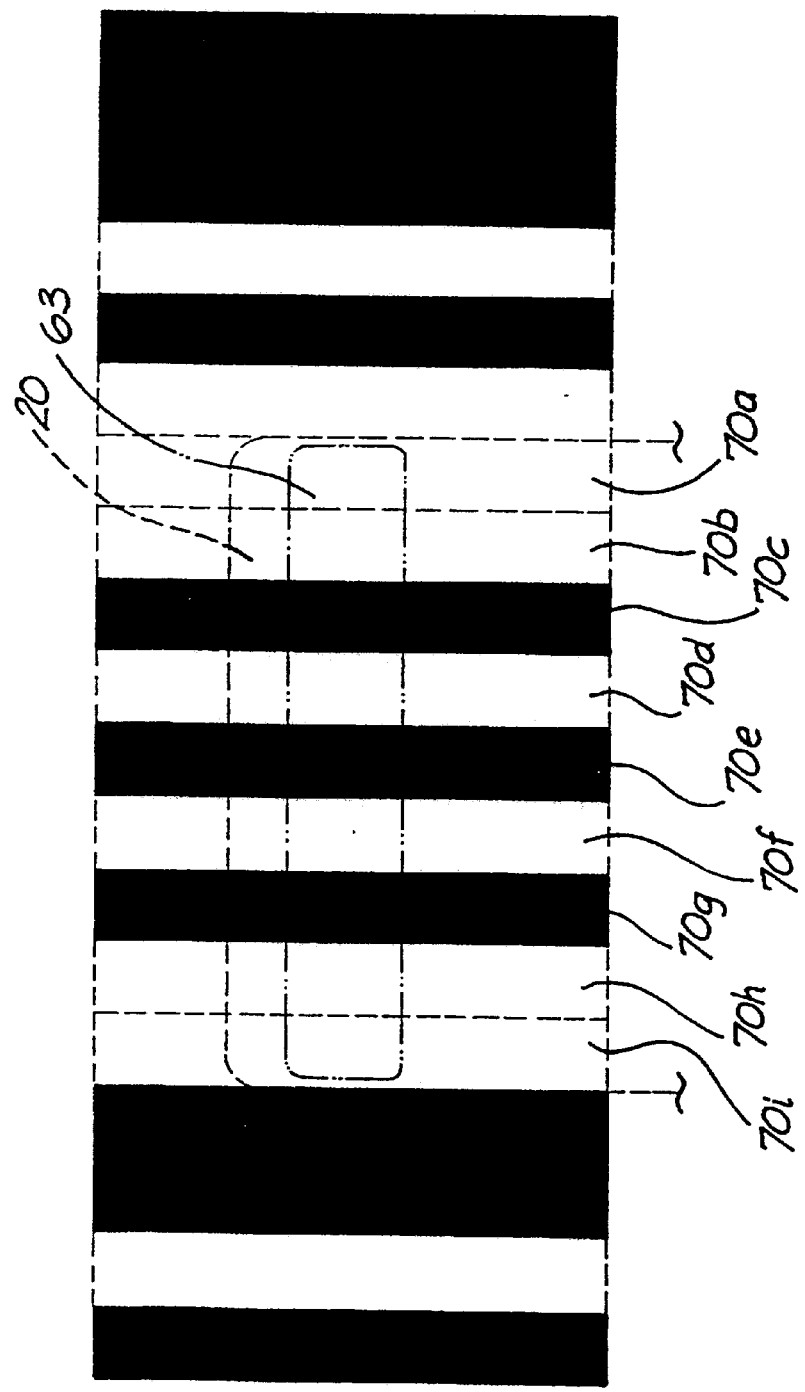
FIG. 29 shows details of the regions of high and low reflectivity on one of the binary bar codes shown in FIGS. 28a and 28b.

FIG. 29 shows details of bar code 70a–i on grating element 58, in. order to better describe the bar code format. Each bar code comprises 9 bars in total. In this embodiment the bars are either regions of high or low reflectivity depending on the binary value of the angle, position value to be encrypted. For the example shown, barcode 70a–i comprises regions of high reflectivity in the form of bars 70c, 70e and 70g and regions of low reflectivity in the form of bars 70a, 70b, 70d, 70f, 70h and 70i. Bar code 70a–i therefore has a binary value of 001010100 or an angle position value of 84 (base 10). The use of nine angle position bars enables theoretically the encryption of up to 512 discrete angle position values which is necessary to encompass and individually identify each of the 512 bar codes on each grating element.

Most importantly however, in both of the bar code embodiments described in FIGS. 26–29, processor 9 is now also programmed to decode the angle position values of all complete binary bar codes which are in the viewing window at any one time. For example in the case of the bar code embodiment shown in FIGS. 26 and 27, bar codes 60c and 61c both correspond to angle position value 54. The use of bar codes in general has two significant advantages in the case of the present invention.

Figure 26E:
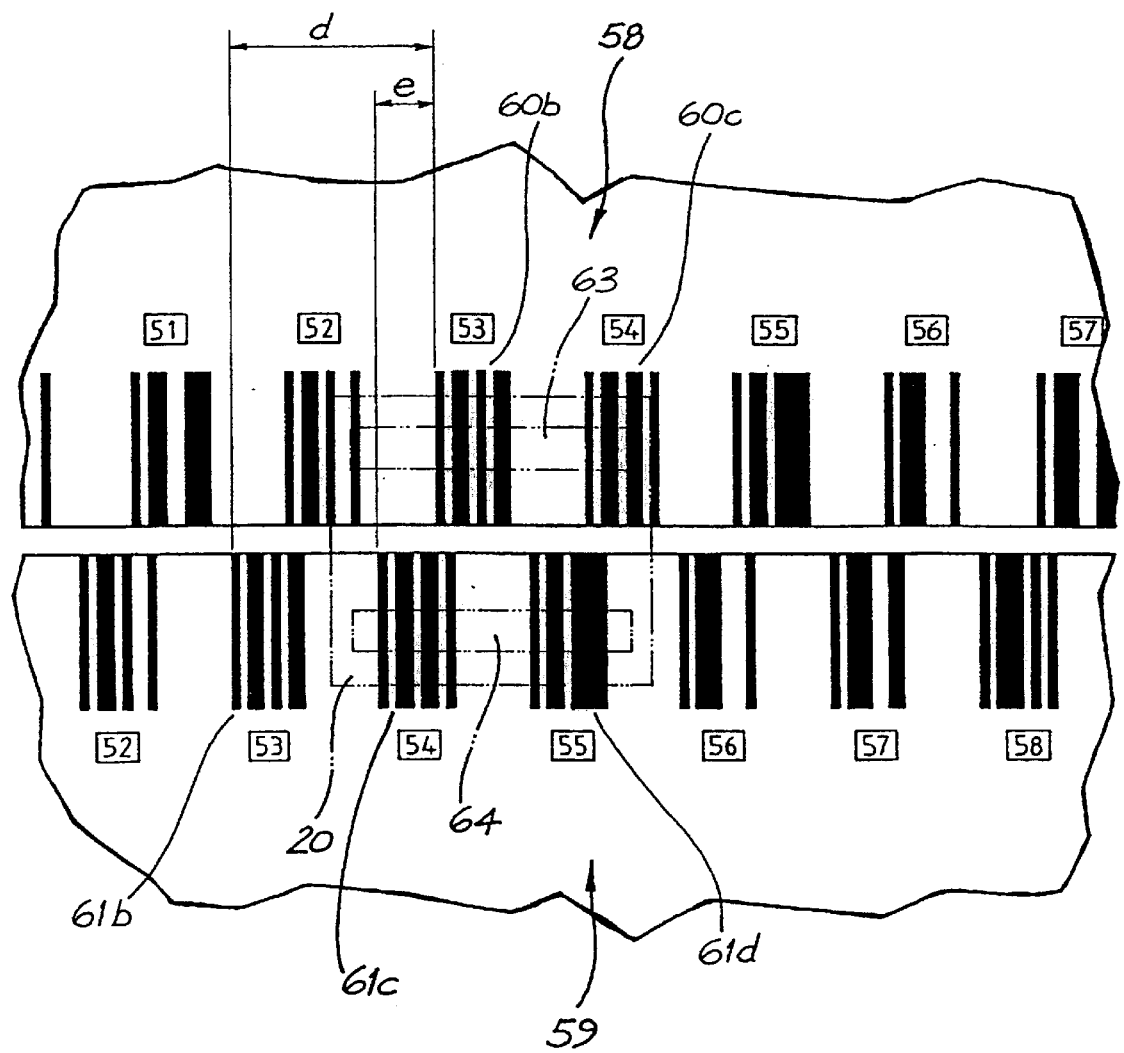

Firstly, for still larger relative displacements of grating element 58 with respect to grating element 59, the problem of aliasing is avoided. This is readily demonstrated in the case of the bar code embodiment shown in FIGS. 26 and 27. In FIG. 26e bar code 60b (angle position value 53). on grating element 58 has displaced a sufficient distance to the right that it now actually lies between bar codes 61c and 61d (angle position values 54 and 55 respectively) on grating element 59. However by recognising that the angle position value of bar code 60b is 53, and that therefore its relative position at the zero torque condition is adjacent to bar code 61b on grating element 59, the correct relative displacement of the grating elements can be calculated as:

$$d=e+(54-53)*3*r*pi/180=e+3*r*pi/180 \text{ (deg)}$$

where r is the radius of the grating element.

Without the use of bar codes, aliasing would have occurred for a much smaller relative displacement of the two grating elements, namely when bar code 60b became adjacent to bar code 61c. By arranging the regions of high and low reflectivity in the former of successive binary bar codes, relative angular displacements of grating elements 58 and 59 can be correctly measured for substantial deviations from the zero torque condition, and independent of the actual spacing of the regions of high and low reflectivity. Secondly, use of bar codes enables measurement of the absolute angular position of either of the two torque input members 1a and 1b through a range of 360 deg, that is +/−180 deg from some known absolute position. This is achieved without the need for any counting process to be carried out in processor 9 (as in the case of the previous alternative version of the third embodiment of the present invention shown in FIG. 19).

If the maximum relative angular displacement of the grating elements is externally limited in some manner, for example via the use of a failsafe mechanism as earlier described, aliasing may not be a problem and in this case successive bar codes may be employed on only one of the two grating elements. This will still provide sufficient information to provide a measure of absolute angular position over the above mentioned +/−180 deg range.

It should be noted that the use of bar codes can be similarly applied to other cylindrical reflective grating element configurations, for example that described in reference to the first embodiment of the present invention (refer to FIGS. 1 and 2). Also barcodes can be applied to radially disposed reflective grating element configurations, for example those described in reference to the fourth (FIGS. 10 and 11) and sixth (FIGS. 15 and 16) embodiments of the present invention.

Also, it should be noted that bar codes can take many forms apart form the non-overlapping (discrete) barcode arrangement shown in FIGS. 26a–e and FIG. 27, and the overlapping (Ouroborean) barcode arrangement shown in FIGS. 28a–b and FIG. 29. For example a classic Manchester barcode arrangement (as used on computer hard disk drives) or a constantly pitched "thick-thin line" barcode arrangement (as used on many household consumer products) would also be suitable for application to cylindrically and radially disposed grating elements.

It should also be noted that the succession of bar codes could have reverse reflectivity compared to the embodiment described, that is low reflectivity regions imposed over a high reflectivity background, rather than the other way around as described. Also in the present specification "high reflectivity" and "low reflectivity" is broadly defined in reference to the particular EMR source selected. For example, if a red light EMR source was used, the regions of high and low reflectivity of the surfaces of the reflective gratings may consist of regions which are painted (or otherwise coloured by some means) with a red and blue surface coating respectively.

Lastly it should be noted that the surfaces of the reflective grating elements may have forms other than the cylindrical or disc-like forms described by way of the above mentioned embodiments. Specifically the surfaces of the grating elements can have other three-dimensional axi-symmetric forms about the axis of the shaft, for example conical, elliptoidal, or paraboloidal forms. Any arbitrary axi-symmetric form of surface can potentially be used providing that the deviation of the distance between the surface and the respective array (receiving incident EMR from this surface) is sufficiently small in magnitude, that the aforementioned lens or fibre optic light guide system can maintain a satisfactory level of focus of the patterns (or subpatterns on the array).

It will be appreciated by those skilled in the art that numerous variations and modifications may be made to the invention without departing from the spirit and scope of the invention.

What is claimed is:

1. A torque transducer comprising a rotating shaft at least partially surrounded by a fixed housing, an axis of rotation of the shaft fixed with respect to the housing, the shaft comprising first and second torque input members, which are connected by a torsionally compliant coupling, the coupling enabling angular deflection of the first torque input member relative to the second torque input member as a function of a magnitude of the torque in the shaft, a first grating element attached to or integral with the first torque input member and a second grating element attached to or integral with the second torque input member, the first grating element comprising a first surface and the second grating element comprising a second surface, the transducer also comprising at least one electromagnetic radiation (EMR) source and at least one array of EMR sensitive detectors, wherein said source irradiates one or both of the surfaces and said array receives incident EMR reflected from one or both of the surfaces, the at least one source irradiating each surface and the at least one array receiving incident EMR reflected from this surface are all positioned on the same side of this surface and fixed with respect to the housing, both surfaces comprise alternating regions of high and low reflectivity, a pattern produced by incident EMR of the at least one array at any instant of time resulting from the alternating regions of low and high reflectivity on the one or both surfaces providing reflected EMR to this array, regardless of the angular position of the shaft and irrespective of the relative angular deflection of the first and second torque input members, the output from the at least one array, resulting from the pattern on the at least one array at said any instant of time, is processed by a processor to derive the relative angular deflection of the first and second torque input members, and hence provide a measure of the magnitude of the torque in the shaft.

2. A torque transducer as claimed in claim 1, wherein a first array receives incident EMR reflected from a first surface and results in a first pattern, a second array receives incident EMR reflected from a second surface and results in a second pattern, the processor receives inputs from the first and second arrays, and the processor comprises software or hardware electronic processing means for determining the relative displacement of the first and second patterns.

3. A torque transducer as claimed in claim 1, wherein the first and second surfaces are either mutually adjacent or contiguous, a single array receives incident EMR reflected from both first and second surfaces and results in a single pattern, the pattern comprises a first subpattern produced by the incident EMR reflected from the first surface and a second subpattern produced by the incident EMR reflected from the second surface, the processor receives inputs from the single array, and the processor comprises software or hardware electronic processing means for determining the relative displacement of the first and second subpatterns.

4. A torque transducer as claimed in claim 3, wherein the single pattern is an interdigital pattern comprising the first subpattern interposed between the second subpattern.

5. A torque transducer as claimed in claim 2, wherein at least one of first or second surfaces is cylindrical with a central axis collinear with the axis of rotation of the shaft, and the array, which receives incident EMR reflected from the at least one surface, is positioned radially inside or outside the surface.

6. A torque transducer as claimed in claim 5, wherein the at least one cylindrical surface is discontinuous due the respective grating element comprising radially protruding castellations around its periphery.

7. A torque transducer as claimed in claim 6, wherein the castellations are substantially axially aligned.

8. A torque transducer as claimed in claim 6, wherein the regions of high reflectivity correspond to the areas of maximum radius of the castellations with respect to the central axis of the cylindrical surface, and the regions of low reflectivity are angularly aligned with the discontinuous gap areas or lesser radius areas between the castellations.

9. A torque transducers claimed in claim 6, wherein the grating element is manufactured from metal or plastic material.

10. A torque transducer as claimed in claim 6, wherein the areas of maximum radius are smoothly machined, moulded or sintered or surface treated with paint or material deposition to impart high reflectivity, and the discontinuous gap areas or lesser radius areas are machined, moulded or sintered, or surface treated with paint or material deposition to impart low reflectivity.

11. A torque transducer as claimed in claim 5, wherein the at least one substantially cylindrical surface is continuous due to the respective grating element comprising a smooth cylinder, and the inside or outside surface of the cylinder comprises the alternating regions of high and low reflectivity.

12. A torque transducer as claimed in claim 11, wherein the regions are axially aligned.

13. A torque transducer as claimed in claim 11, wherein the regions of high reflectivity are metallised, shiny or light coloured, and the regions of low reflectivity are substantially transparent, roughened or dark coloured.

14. A torque transducer as claimed in claim 2, wherein at least one of first or second surfaces is radially disposed with respect to the axis of rotation of the shaft, and the array, which receives incident EMR reflected from the at least one surface, is positioned axially on one side of the surface.

15. A torque transducer as claimed in, claim 14, wherein the radially disposed surface is discontinuous due to the respective grating element comprising axially protruding castellations around is periphery.

16. A torque transducer as claimed in claim 15, wherein the castellations are substantially radially disposed.

17. A torque transducer as claimed in claim 15, wherein the regions of high reflectivity correspond to the areas of maximum axial protrusion of the castellations, and the regions of low reflectivity are angularly aligned with the discontinuous gap areas or less axially protruding areas, between the castellations.

18. A torque transducers claimed in claim 15, wherein the grating element is manufactured from metal or plastic material.

19. A torque transducer as claimed in claim 15, wherein the areas of maximum axial protrusion are smoothly machined, moulded or sintered, or surface treated with paint or material deposition to impart high reflectivity, and the discontinuous gap areas or less axially protruding areas are machined, moulded or sintered, or surface treated with paint or material deposition to impart low reflectivity.

20. A torque transducer as claimed in claim 14, wherein the radially disposed surface is substantially continuous due to the respective grating element comprising a substantially smooth disc or planar ring, and one side of the disc or planar ring comprises the alternating regions of high and low reflectivity.

21. A torque transducer as claimed in claim 20, wherein the regions are substantially radially disposed.

22. A torque transducer as claimed in claim 20, wherein the regions of high reflectivity are metallised, shiny or light coloured, and the regions of low reflectivity are substantially transparent, roughened or dark coloured.

23. A torque transducer as claimed in claim 1, wherein the array comprises a one dimensional or a two dimensional array, a CCD, a VLSI vision chip or a lateral effect photodiode.

24. A torque transducer as claimed in claim 1, wherein the pattern or patterns is also processed by the processor to derive the angular velocity of at least one of the torque input members.

25. A torque transducer as claimed in claim 1, wherein the pattern or patterns is also processed by a processor to derive the relative angular position of at least one of the torque input members.

26. A torque transducer as claimed in claim 1, wherein the first and second grating elements are adjacent and comprise radially extending intermeshing castellations, clearances being provided between the castellations and thereby providing a rotational lost motion connection between the first and second input torque members and hence limiting the maximum angular deflection of the torsionally compliant coupling.

27. A torque transducer as claimed in claim 1, wherein the surface of at least one grating element includes areas or additional regions of high or low reflectivity whose resulting pattern is also processed to derive the absolute angular position of the torque input member to which the at least one grating element is attached to or integral with.

28. A torque transducer as claimed in claim 1, wherein the alternating regions of high and low reflectivity on the surface of at least one grating element are arranged in the form of a succession of individual binary bar codes.

29. A torque transducer as claimed in claim 28, wherein the succession of bar codes is arranged such that the individual bar codes do not overlap.

30. A torque transducer as claimed in claim 28, wherein the succession of bar codes is arranged such that the individual bar codes overlap.

31. A torque transducer as claimed in claim 28, wherein the resulting pattern on the respective array is processed to derive the absolute angular position of the torque input member to which the at least one grating element is attached to or integral with.

32. A torque transducer as claimed in claim 31, wherein a succession of binary codes are employed on both grating elements and the difference in the absolute angular position of the first and second torque input members is used to provide a measure of the magnitude of the torque in the shaft.

* * * * *